US008789012B1

(12) United States Patent
Tolle

(10) Patent No.: US 8,789,012 B1
(45) Date of Patent: *Jul. 22, 2014

(54) SYSTEM AND METHOD FOR AUTOMATICALLY GENERATING COMPUTER CODE TO OBTAIN DATA FROM DEVICES OPTIONALLY USING A WEB SERVICES INTERFACE

(75) Inventor: Gilman Tolle, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1254 days.

This patent is subject to a terminal disclaimer.

(21) Appl. No.: 12/002,615

(22) Filed: Dec. 17, 2007

(51) Int. Cl.
*G06F 9/44* (2006.01)

(52) U.S. Cl.
USPC ........... 717/106; 719/313; 719/314; 719/315; 719/316; 719/317

(58) Field of Classification Search
USPC .......................................... 719/313–317, 330
See application file for complete search history.

(56) References Cited

U.S. PATENT DOCUMENTS

| 5,499,371 A * | 3/1996 | Henninger et al. ........... 717/108 |
| 6,876,324 B2 | 4/2005 | Sasada et al. |
| 7,181,731 B2 * | 2/2007 | Pace et al. ..................... 717/136 |
| 7,249,345 B2 * | 7/2007 | Zorc ............................. 717/106 |
| 7,694,272 B2 * | 4/2010 | Bronicki et al. .............. 717/109 |
| 7,716,632 B2 | 5/2010 | Covely, III |
| 2003/0167444 A1 * | 9/2003 | Zorc ............................. 715/513 |
| 2005/0253717 A1 * | 11/2005 | Howarth et al. ........... 340/572.1 |

* cited by examiner

*Primary Examiner* — Chat Do
*Assistant Examiner* — Sergio J Curbelo, III
(74) *Attorney, Agent, or Firm* — Fish & Richardson P.C.

(57) ABSTRACT

A system and method accepts source code including one or more variables or constants, and, for those variables or constants flagged as those that are to be automatically provided to a gateway, generates or provides communication code and a description that allows the values to be sent to a gateway for retrieval using a variety of formats, such as conventional web services formats.

16 Claims, 6 Drawing Sheets

SYSTEM AND METHOD FOR AUTOMATICALLY GENERATING COMPUTER CODE TO OBTAIN DATA FROM DEVICES OPTIONALLY USING A WEB SERVICES INTERFACE

RELATED APPLICATIONS

This application is related to U.S. patent application Ser. No. 11/516,841 entitled, "System and Method for Identifying Whether Remote Devices are in Proximity" filed on Sep. 6, 2006 by Jonathan Hui and David Culler, and to application Ser. No. 12/002,640 entitled "System and Method for Providing Computer Code To Obtain Data From Devices Optionally Using a Web Services Interface" filed by Gilman Tolle concurrently herewith, each having the same assignee as the present application, and each is hereby incorporated by reference in its entirety.

FIELD OF THE INVENTION

The present invention is related to computer software and more specifically to computer software for automatically generating data communications computer software.

BACKGROUND OF THE INVENTION

Many different portable devices can communicate with a gateway device. The gateway acts as a bridge between the wireless portable devices and the wired computer networks, such as the Internet or other wireless networks. A gateway device may include a standard server, with additional software that allows communications to be made between the gateway and the portable devices, which may be wireless, and between the gateway and other devices that desire information from the wireless devices, and with which the gateway may be in communication.

Developers may write custom application software for the portable devices. However, such software may only serve to identify values of interest with the values remaining on the portable devices. Getting the values from the device to the gateway, and from the gateway to other devices that can use such values can involve significant effort. To perform such functions, a communication facility must be written for the device. A separate facility must also be written for the gateway to allow it to receive and store the values. However, it may be desirable to make the communication facility operate as efficiently as possible, and thus using conventional communication facilities may not achieve the desired level of communication efficiency. Furthermore, the use of a conventional facility to communicate the values of interest from the devices to the gateway would require the programmer to convert the values into a format used by the communication facility. The applications programmer may not have the expertise to make the most efficient communications, and acquiring such expertise would be a time consuming task. Even then, some efficiency may be lost.

The communication facility between the device and the gateway is not the only modification that would be required in such a system. It would also be necessary to provide a facility to allow the gateway to receive and respond to requests from external sources for the values received from the devices in an easy to use format. Conventional Web services provide such a format, but there are several of these formats, and it can be tedious to write conversion software for the gateway that will accept requests in any of several Web services formats and return the proper response to the originator of the request. Not only is the software to perform all of these functions tedious to write, but it can also require knowledge of communications techniques and Web services formats that the developer of the application software for the device may not wish to learn.

Furthermore, different types of devices and different gateways may each use their own data formats, making the conversion of any format on the devices to any format on the gateways, in order to allow any device to communicate with any gateway, an unwieldy problem.

The developer may have put a great deal of thought into the data structures that are used to provide the data, and the developer may wish to use those same data structures or something very similar when data is provided in response to a query. Thus, it is desirable to maintain, as closely as possible, the data structures used on the device when the data is made available on the gateway.

To enable the developer to maintain the same data structures, the developer may program the gateway to respond to requests for values received from devices. However, the owner of the gateway may be different from the developer of the device, and the owner of the gateway may wish to employ a uniform standard of operation. The owner of the gateway may thus be reluctant to allow each developer of an application on the device to program the gateway, because each developer of a multitude of applications could introduce slight changes in convention that would make it difficult for parties that use the gateway to do so in a consistent fashion when information that was programmed by different developers is retrieved. Thus, it may not be desirable to have the developer of the device develop applications on different gateways.

If different parties develop for the device and the gateway, compatibility testing becomes more complex. The significant compatibility issues repeat themselves via the interface to the gateway from the other devices requesting the information stored on the gateway. Parties who desire to use the gateway to request information from a device must know the format into which the request must be made, and must know how the response will be received. Frequently, a programmer programs the gateway software, and a technical writer writes the instructions for the parties who will use the gateway. This can be not only a source of compatibility problems between the documentation and the software, but the technical writer is so far removed from the programmer of the device, that nuances in the data structures can be completely missed.

The compatibility testing between these three areas is not only time consuming and tedious to perform, but the errors that inevitably slip through can again cause the system to operate improperly, and problems can be difficult to identify. The significant compatibility testing between these three areas is thus a major source of frustration and expense.

It can be desirable for any solution to use a flexible approach to allow for differences in the various gateways that may be used to communicate with the devices. Different gateways may use different compiler software and their operators may desire to use different types of web services or other similar approaches to provide the interface with the senders of the requests for data from the devices. Thus, allowing sufficient flexibility to choose the type of interface, and type of compiler can be helpful.

Because the devices may be mobile, they may move in and out of range of different gateways at different times. There may be dozens or hundreds of such devices, and each device may support a variety of applications. Requiring every gateway to have interface software for every possible device can be a logistical nightmare. It would be desirable if the gateway software for every possible device did not have to be installed on every gateway. It would also be helpful if the device software and gateway software could handle communication interruptions as the device moved in and out of range. However, because storage space on a device may be at a premium, it is desirable to handle such interruptions in communication in a flexible manner.

What is needed is a system and method that can allow information to be obtained from a device using a gateway that does not require a programmer of a device or gateway to write a communication facility between the device and the gateway and from the gateway to the requesters of information provided from the device to the gateway, reduces or eliminates compatibility testing between the gateway and the device, allows the programmer input into the description that allows parties using the gateway to request information from it, is compatible with a variety of capabilities of the gateways that may wish to provide information from devices, can handle interruptions, and does not require the gateway to have installed all of the interface software for every possible device until such software is used.

SUMMARY OF INVENTION

A system and method accepts source code that is intended, at least in part, to operate a device, such as an independently-powered portable device capable of sending and receiving wireless transmissions, accepts an optional input profile, and uses the code and optional profile to generate a communication system between the device and the gateway, and a Web services system for the gateway, which may include a server, and any number of portable devices. The code is marked to allow all, or some, but not all, of the container values used in the code for purposes other than to be sent to the gateway to be sent from the device to the gateway, without the programmer of the source code coding most or all of the source code to implement such functions. In one embodiment, the code that is generated accepts a function call that the programmer uses to send the container values. In another embodiment, the code automatically, and periodically, retrieves the container values The communications system is capable of sending certain identified values from the device to the gateway and storing them on the gateway, and the Web services system is capable of accepting at the gateway requests for values via a conventional Web services interface, or an interface that may be similar thereto, and responding to the request, either on a one time basis or an ongoing basis.

To perform such functions, the system and method uses the input profile and the source code to generate an entry in a new profile for each value in the source code for the device that is marked as one that should be made available remotely. The new profile or an address thereto can be provided to a server or gateway device, either shortly after the creation of the new profile, or by the device at a later time. The gateway device can use the new profile to build a description, such as a Web services description, and make it available to other parties using different devices in communication with the server or gateway device.

Software is also generated for the device using the code and the new profile. The software generated either accepts via a function call the programmer uses to send the container values, or repeatedly retrieves, the current value of one or more variables or constants (referred to herein as "containers") and assigns a sequence number to that current value. The software generated provides any such values to the gateway after converting them into a network format and optionally packing them, and includes an identifier of the "event channel" to which the container corresponds, to allow the server to identify the name and format of the container having the value or values being provided. There may be several values of a single container, for example, if the container has a structured type.

During interruptions in communication between the device and the gateway, the software generated for the device can store container values flagged for this capability, utilizing device storage for this purpose only if it is indicated as being allowed for that container.

The gateway uses the new profile to generate computer code that can receive values from the device and allows the gateway to process requests for such values, returning to the requester or a specified destination any values corresponding to the request. A subscription to such values may be arranged so that, as new values become available, they can be made available to the requester.

The software generated for the gateway from the new profile receives the container values, optionally unpacks them, converts them into the format of the one or more Web services used to provide such values to users, and stores them on the gateway. Using the sequence number returned with the container values, the software provides the values in the format to which they were converted to devices that send to the gateway requests for such values using a Web service request.

The use of a common network format simplifies the format conversions that could otherwise be required, as the gateway or server device, and the devices on which the values reside, need only convert between their own device format and the network format.

Because the system and method generates the software to return the values requested using the source code for the device and optionally, the input profile, the developer need not write significant additional source code, other than to mark the container or containers in the existing source code to indicate that they are remotely retrievable, and to link each such marked container to an entry in the profile the developer may create using a common name.

Because the code generated has a single source, much of the compatibility testing is eliminated, and what remains is greatly simplified.

Because the gateway software can be generated from the new profile, the device can provide or otherwise make available the new profile to the gateway, either automatically, or upon request by the gateway, and the gateway can then generate the appropriate gateway software using the profile, eliminating the need for the gateway to maintain code to handle every possible device. Because the gateway uses the new profile to generate the gateway software, the gateway can tailor the gateway software to the capabilities of the gateway, to any number of desired interfaces, such as Web services interfaces, using the same convention for each container value the gateway will receive.

Custom software need not be automatically provided to the device or the gateway. Either one of these may utilize a non-customized solution as long as software on one such device is customized in accordance with the program that operates the device.

DETAILED DESCRIPTION OF A PREFERRED EMBODIMENT

Figure 1:
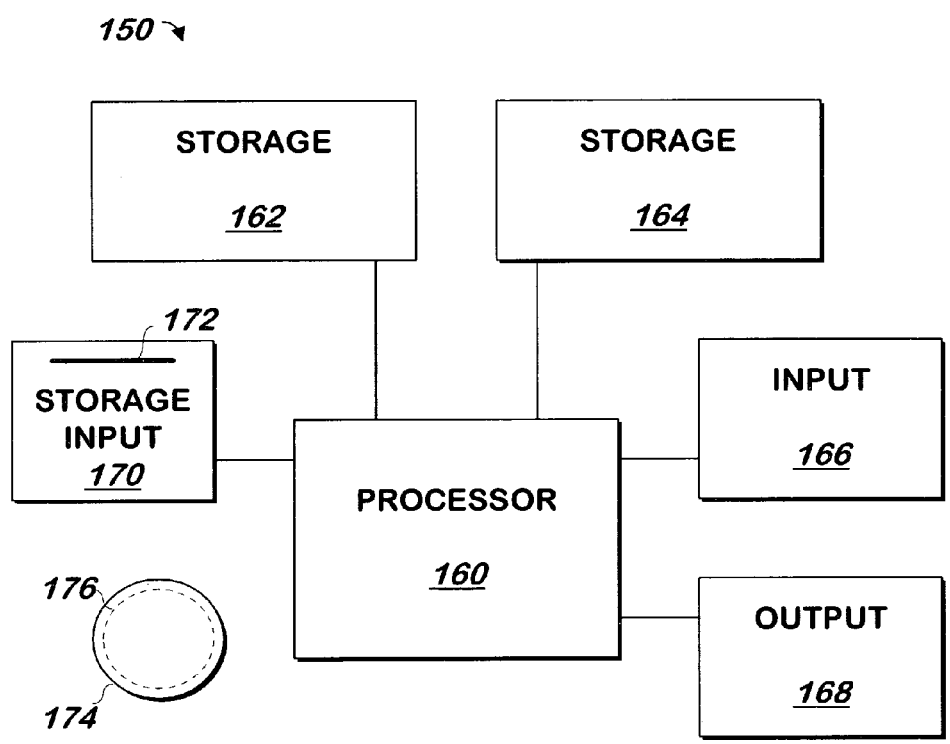
FIG. 1 is a block schematic diagram of a conventional computer system.

The present invention may be implemented as computer software on a conventional computer system. Referring now to FIG. 1A, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems, Inc. of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or a Macintosh computer system running the MacOS or OpenStep operating system commercially available from Apple Incorporated of Cupertino, Calif. and the Netscape browser commercially available from Netscape Communications Corporation of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

The method of the present invention accepts source code intended for use on a device, as well as an optional input profile, and adds to the source code. The source code received is source code intended to operate the device, for example by receiving as inputs sensor outputs and optionally processing them. The source code and the added source code may be compiled using a conventional compiler (or they may be left as source code for interpretation). The system and method provides a new profile based on the input profile and the source code. That new profile may be provided directly to a gateway, or the new profile may be provided to the device or a separate server, and the device may provide it to the gateway at a later time or may provide a URL to the new profile on the separate server, and the gateway can retrieve the new profile from the separate server. The foregoing is described in more detail with reference to FIG. 2. The gateway accepts the new profile, converts it into source code for the gateway, which may include one or more separate servers in communication with the remainder of the gateway, that, when compiled and run on the gateway, accepts requests for data, and provides them to the device. This is also described with reference to FIG. 2.

The device provides any values corresponding to the event channels to the gateway device after optionally packing the values and transforming them into a common format, referred to as the "network format". Such providing is described in more detail with reference FIG. 4. Values corresponding to event channels are repeatedly provided so that as the values change, they are provided. In one embodiment, values corresponding to event channels that have not changed are not provided or have a lower priority for being provided, with values corresponding to event channels that have changed having a higher priority and are therefore provided first, with values that have not changed provided after such changed values if bandwidth and time permits.

Figure 3A:
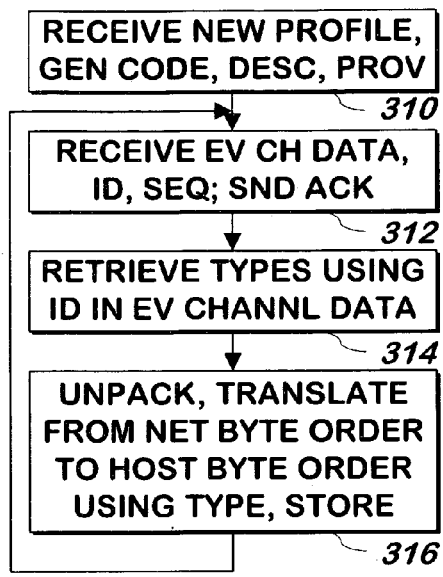
FIG. 3A is a flowchart illustrating a method of receiving and storing event channel information according to one embodiment of the present invention.

The compiled code running on the gateway receives data from the devices optionally unpacks it, converts it from the common format, and stores it as described in FIG. 3A. The compiled code running on the gateway also receives requests for data, such as those in conventional Web services formats. The requests are responded to using information received from one or more devices. The foregoing is described in more detail with reference to FIG. 3B. As noted, a server may be a separate part of the gateway device. As described herein, the gateway device operates as a server for Web services communications, so it is not described as being separate, though a gateway can service one or more separate servers, with the collection of the gateway and the servers dividing up the functions described herein as being provided by the gateway using any divisions desirable.

Preparing Additional Code Using Device Source Code.

Figure 2:
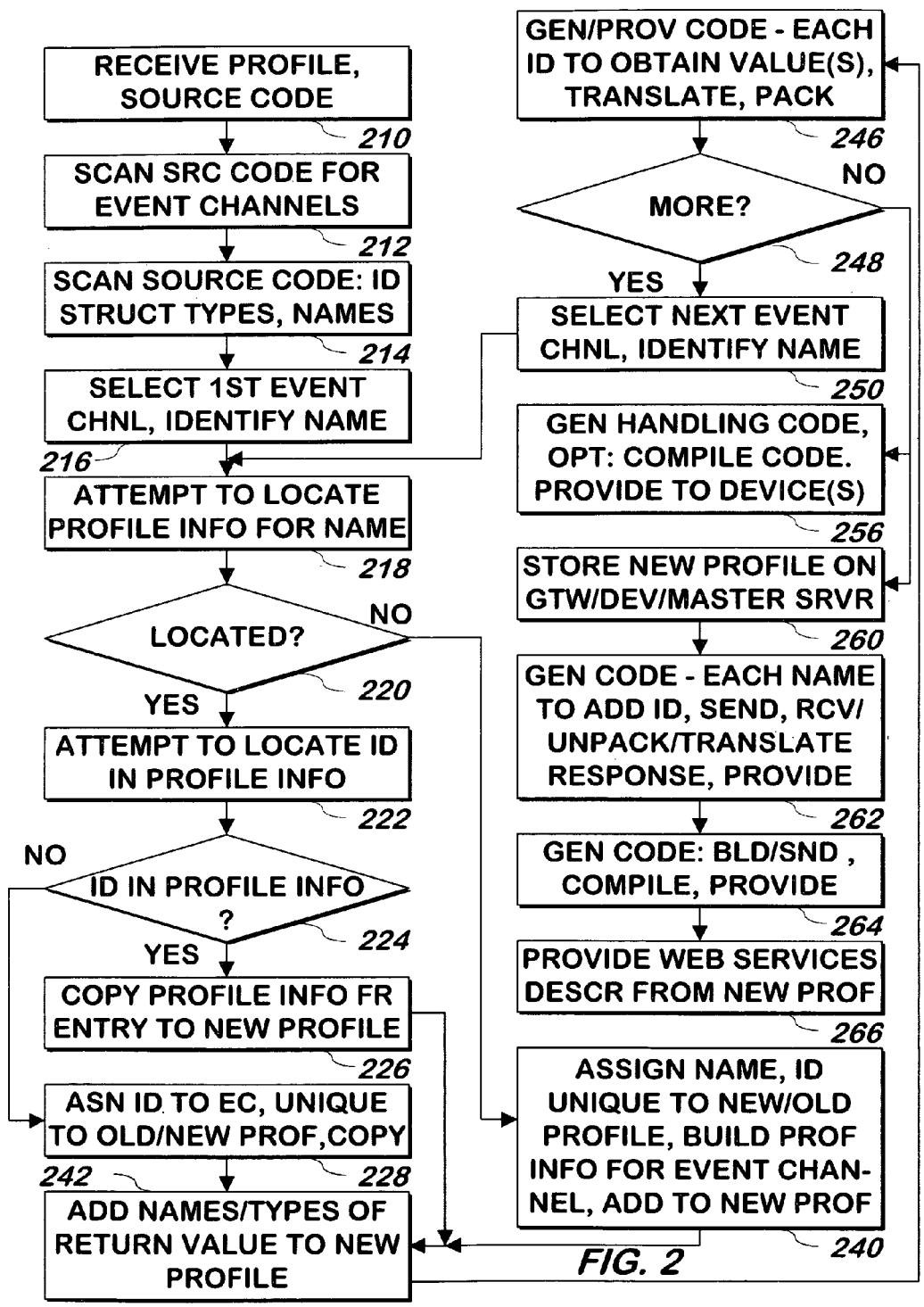
FIG. 2 is a flowchart illustrating a method of generating code for a gateway and one or more devices according to one embodiment of the present invention.

Referring now to FIG. 2, a method of preparing one or more gateways and one or more devices to communicate data is shown according to one embodiment of the present invention. Computer code capable of either running on a device or capable of being compiled and running on a device, and an optional input profile for the computer code, are received 210 for use as described herein and below. In one embodiment, the device is moveable, and has a power supply that is not connected to a conventional power grid used by buildings in the area. For example, the device may be battery powered. There may be any number of the devices and a smaller number, such as one or more, gateways, communicating with such devices.

The input profile contains profile information for one or more event channels, as described in more detail herein and below. It is not necessary that the input profile be received at all, though as noted herein, it can be helpful when an input profile is received. In one embodiment, the computer code includes conventional computer source code, including any or all of compiler directives, functions, procedures and the like.

An event channel corresponds to a container value on a device that is identified as one that should be sent to a gateway. Other container values in the source code not so identified are not sent to the gateway.

The computer code received is scanned 212 for event channel declarations. As used herein an event channel declaration is any form of indication that a value named in the computer code is to be sent to a gateway. The value may be variable or fixed. In one embodiment, an event channel declaration is a separately specified declaration, for example, one that includes a line containing the format "@eventchannel(eventchannelname)", where the event channel declaration is everything between the quotes, and "eventchannelname" is replaced with the name of the event channel. The name of the event channel is used to match the event channel with information regarding the event channel in the profile if one was received.

In one embodiment, there may be different requirements to cause an event channel to be declared. For example, in one embodiment, an event channel is declared as part of a module declaration. The name of the container valve that should be retrieved as part of the event channel is also specified, along with its type. A container may be anything that has a value that can be read. For example, to retrieve the value of an interface having a specified type of uint16_t, named "eventproducer", the event channel declaration would be part of a module declaration, as follows:

```
module {
    uses interface eventproducer<uint16_t>as TemperatureReadEvent
        @eventchannel ("TemperatureReadEvent");
}
```

In another embodiment, an event channel may be declared at a variable or constant declaration via the addition of a flag indicating that the container value is to be remotely retrievable. The flag may include a name by which the value of the variable or constant may be remotely retrieved.

In one embodiment, the name by which a value is remotely retrievable can be different from the name used to declare the actual variable or constant in the computer code. The declaration of a remotely retrievable value contains the flag, as well as the type of the value to be returned. In the above event channel declaration, the type is an unsigned 16 bit integer having an exact 16 bit width. In one embodiment, a type used may be a elemental type used by the compiler or a structured data type. Although only one named container value may be used for each event channel in some embodiments, the use of structured types can allow any number of values to be provided as part of a single event channel. In other embodiments, any number of container values may be used, and the type and order of each container value is specified in the event channel declaration.

The computer code received is scanned for type definitions or structured type definitions referenced in the event channel declarations located in step 212, and any such type definitions or structured type definitions are identified, located in the computer code (which may involve one or more computer files), parsed, and stored for use as described below 214. As part of step 214, if a type or structured type definition references other any other type definition or structured type definitions; that type definition is also identified, located, parsed and stored, until any structured type definition referenced in any event channel declaration is defined in terms of elemental types used by the compiler that would compile the source code supplied. In one embodiment, structured type definitions include the name of the structured type, and one or more of the elemental data types that make up the structured type. For example, a structured type may have a name "date" and contain three short integers: day, month and year. Another structured data type may have a name of "signature", and contain a graphic object and a date structured data type. In the event that the data type is a structured data type, the variable names of each of the variables in the structure definitions are stored, associated with the structured type as part of step 214.

The first event channel declaration is selected and the name of the event channel corresponding to that declaration (which may be the same as, or different from, the name of the variable or constant used in the program) is retrieved from the event channel declaration 216.

In one embodiment, all event channels have a name, which may be the name of the variable or constant value to be returned in response to an event channel request. Other embodiments allow a different name to be specified as part of the event channel declaration. If no name is specified, one is assigned, for example, either by using the name of the variable or value to be returned in response to the event channel call, or by appending one or more digits to such name until the name, so modified to be unique to all event channel names specified, all event channel names in the profile received, and all other names assigned.

An attempt is made 218 to match the name in the event channel declaration with any names in the input profile optionally received in step 210. If the name of the event channel declaration matches an entry in the profile 220, an attempt is made to locate an event channel identifier in the profile entry containing the matching name 222. In one embodiment, an event channel identifier is a numeric identifier.

If an event channel identifier is specified 224 (and in one embodiment if the event channel identifier is different from any event channel identifier stored) in the selected profile information, some or all of the profile information from the matching entry in the input profile received in step 210 is copied as an entry in a new profile 226, and an indication that the event channel identifier was not assigned is also stored in the new profile entry as part of step 226.

In one embodiment, the profile information may include the event channel identifier and a text explanation of the event channel itself, including a description of any event channel container values, and their data types. This description is copied. The method continues at step 242.

If there is no event channel identifier in the entry with the matching name in the profile 224, an event channel identifier is assigned that is different from the identifiers in the input profile received in step 210 and in the new profile. The name, assigned event channel identifier, and other profile information (for example, the description of the container value or values corresponding to the event channel) from the matching entry is copied as an entry in the new profile, along with an indication that the identifier was assigned 228, and the method continues at step 242.

If, at step 220, the name of the event channel is not found in the profile received in step 210 (or no profile was received), an entry for the event channel is added 240 to the new profile, such entry including the name from the event channel declaration; an event channel identifier that is different from all of the identifiers in the profile (if any) received in step 210 and those in the new profile; an indication that the identifier was assigned; and other optional information, such as an indication that no profile entry was located for the name. In one embodiment, some or all of the event channel declaration itself is copied into the entry in the new profile as a description of the event channel, to allow users to see the container name or names and types to enable them to fashion a request for event channel container values, and in another embodiment, no such information is copied. Such information may also be copied as part of steps 226, 228, or both. In one embodiment, a similar entry is also added to the profile received in step 210. The method continues at step 242.

At step 242, names and types of the container values, including any names and types of portions of the container value specified as a structured type, are added to the entry in the new profile for the currently selected event channel declaration. The order of the names of the container values in the entry correspond to the order in which the container values specified in the event channel declaration will be sent as described herein.

In one embodiment, each of the types of the container values in the new profile are listed the network types of the container values, and thus step 242 includes converting each of the types of the container values from the host type of the device to one or more network types. As noted above, each container value has two types on any device where it may reside: a host type and a network type. Although each of these two types may be different, they may be the same. The host type is the type of the container value as it exists in the host. In the case of a device, the host type may be any of the types that is used by the compiler, and the network type is the conversion of that type to a set of types that other devices can convert to or from.

In one embodiment, the network types are any of those described in Chang and Gay, "Language Support for Interoperable Messaging in Sensor Networks" SCOPES '05 Sep. 29-Oct. 1, 2005, Dallas Tex. (ACM 2005), including arrays of data types and structured types that may include arrays. In other embodiments, additions to these types may be used, or other basic data types may be used as the network types.

The type specified may be converted into a network type, one or more arrays of network types, or one or more structured network types (including one or more arrays), that most closely corresponds to the data type specified in the selected event channel declaration.

In the event that the data type is a structured data type, the variable names of each of the variables in the structure definitions are stored as part of the names and types stored in the new profile and the types of each elemental type are converted as described above.

Following step 242, in one embodiment, code is generated 246 for the new profile entry corresponding to the selected event channel, such code being for execution on the one or more devices. The code for each new profile entry either retrieves, or accepts via a function call, one or more event channel container values corresponding to the container specified for the event channel, which are values corresponding to the event channel declaration. The code then translates to network types, and optionally packs into an event channel data structure, the one or more event channel container values, and adds to the event channel data structure a sequence number unique to recent data for that event channel, and provides the event channel data structure to the gateway device or other device as described in more detail herein, including FIG. 4.

In the embodiment in which the code retrieves the data itself, the code may be generated as a function call, and additional code that initializes a timer, when the timer elapses, calls the function and resets the timer to repeat the process periodically. In the embodiment in which the code receives the data when called by the remainder of the program written by the programmer, the code may be generated as a function call that receives as a parameter the name of the container value defined for event channel. The program written by the programmer may call, optionally repeatedly, the function to provide the container values. The function may be named using a prearranged format, for example using the name of the event channel or it may be specified as part of the event channel declaration. Because the name of the function may be determined in advance, and the argument is the container value or values defined for the event channel, the function call may be made by the programmer in the program before the code containing the function is generated.

The event channel data structure will contain all of the data corresponding to a container having a structured type, with each variable or constant value having an order corresponding to the order of such variable or constant names in the new profile. In one embodiment, communications from the device to the gateway are performed wirelessly.

In one embodiment, if the event channel is specified either in the declaration or in the profile as one that can replay data from a log, the code additionally performs the logging and sending function described herein.

The code for the one or more devices may incorporate the information included in any or all of the declaration, input profile and new profile into the code. In one embodiment, the code may use the new profile as an input, and be reusable for different profiles. In this embodiment, the new profile is considered to be the code automatically generated. It is noted that code described as generated herein is "automatically" generated, meaning without human customization.

Packing and unpacking may include removing and adding padding bytes where the device uses padding bytes, for example to align a word having a multiple of two byte size (e.g. 2-bytes, 4 bytes, etc.) on a two byte boundary following or preceding, for example, a one byte word.

If there are more event channel declarations 248, the next event channel declaration is selected, the name of the event channel declaration is identified 250 and the method continues at step 218 using the name and event channel declaration selected.

If there are no more event channel declarations 248, the method continues at steps 256 and 260.

In one embodiment, instead of generating custom code in step 246, general purpose code is provided that need not be adapted based on the event channel declarations. In this embodiment, code is provided that performs the translation and packing functions described above when called by the programmer with the identifier of the event channel. The code provided has different functions with different names that are called by the program on the device based on the type of the container to be sent. In one embodiment, there is one function for each elemental type. The program provides the function with a serial number, an order and an indication as to whether the value is the last one to be sent. The function collects the data values provided with the same serial number until the one indicated as being last is provided, then translates and optionally packs the data as described above, sending it ordered in such a way that when it is optionally unpacked and translated by the computer code on the gateway, it can be provided in the order indicated by the program calling the function.

In one embodiment, the code that translates, packs, builds and sends the event channel data structure as described above may be reused and need not be duplicated for each event channel. In any embodiment, code may be generated for event channel handling as part of step 256. The code generated for the event channel handling adds to the one or more code segments generated in step 246 code that selects an event channel identifier by identifying the one that was the oldest one sent or the oldest one acknowledged and operates the code segment that builds and sends the event channel data structure based on the selected event channel identifier.

Also as part of step 256, the code for the device or devices generated in step 246 that is not already in object code form, and the source code received in step 210, is compiled and provided to the device or devices. It is noted that some or all of the code may have been provided as described herein in object code form, and so the present invention does not require compilation, though in one embodiment, all code provided is provided in source code form, which is compiled as a part of step 256. The compiler is one that would have been used to compile the source code received in step 210 had it not had any event channel declarations. Other embodiments use only an interpreter, not a compiler, and so no compilation is performed, and step 256 includes providing the source code to the device for interpretation or compiling into byte codes and providing the byte codes for interpretation.

At step 260, the new profile is stored, for example, on the gateway for use as described below, or the new profile may be stored on the one or more devices, which may provide the new profile to the gateway, for example, upon request or upon detection of a transmission path to the gateway, at a later time, though as part of step 260 in the flowchart. In still another embodiment, the new profile is stored on a master server, with the address (e.g. the URL) of the new profile stored in the device or devices that will communicate with gateways that themselves communicate with software derived from the new profile or the source code used to derive the new profile as part of step 260. When a device communicates with a gateway for the first time, the gateway can request either the new profile or its URL. The device will provide either the new profile, or the URL, and the gateway will obtain the new profile from the device or from the master server using the URL. The master server may be a part of any gateway, or it may be a separate device. Each of these things are performed as part of step 260.

Gateway code is generated or provided for each entry in the new profile 262. In one embodiment, the gateway code may be generated using only the new profile, or it may be generated using any or all of the new profile, the code received in step 210 and the input profile, any of which may be received as part of step 310. As noted, the gateway code may be code that runs on, or is capable of being compiled to run on, the gateway, or that runs on one or more separate servers that are considered to be part of the gateway, which may include byte codes. The code generated for each entry receives a request to retrieve a value or values via the Web services format provided by that server or gateway (e.g. REST or SOAP), the request containing the name of the event channel corresponding to the values desired, and provides the values corresponding to the request. In one embodiment, the code is generated to accept the request in a conventional Web services format, though there may be several versions of the code generated, one for each of several Web services formats. Other embodiments use other formats that are not conventional Web services formats. Such formats may be similar to Web services formats or entirely different. The code generated will be consistent with the description generated as part of step 266, described below, to allow users to use the description and optionally other inferred knowledge to generate requests to which the code will respond.

The code additionally receives event channel identifier, the container value or values for that event channel (there may be multiple values, e.g. if the container for the event channel corresponds to a structured type) and the sequence number, for example, as part of an event channel data structure as described above; optionally unpacks the value or values using the entry in the new profile corresponding to the event channel identifier; converts the value or values from the network types into the Web services type of the container value or values using the entry in the new profile corresponding to the event channel identifier; and stores the values, sequence number and identifier, and optionally, the date and time as described in more detail herein. Translation may include changing the byte order, such as from big-endian to little-endian, or vice versa, or performing other translations, such as putting each character of a string into an array.

In one embodiment, the code generated is tailored using the information in, or information that will go into, new profile and some or all of this information is also built into the code. In another embodiment, the code is designed to accept the new profile as an input and use the information from the new profile as it operates as described above. In this embodiment, the code is capable of being generated well in advance of the time the new profile is available. The code that is automatically generated is thus limited to the new profile. The remainder of the code can be reused from one new profile to the next. Such an arrangement may be used for the code in the gateway or server, but it may also be used for the code in the device if a provision is made to allow the code that retrieves the values to be called in a variable fashion, for example, by placing the address of each code portion retrieving a different value in a table of event channel identifiers and such addresses, and allowing program control to be transferred using the table.

It is noted that the code generated may be generated without significant (or any) user input after the generation process is started. Other than specifying parameters such as source and destination and optionally the types of the device and the gateway, no additional user input is needed to allow the code for the device or the gateway to be generated, although additional user input can be requested and used, for example, superfluously.

The code is compiled and provided to one or more gateways 264. Alternatively, the code generated in step 262 may be generated in object code form, in which case compiling in step 264 is not performed. As noted, the code may be generated and compiled at any time. In other embodiments, compilation is not performed, and the source code is used instead of the compiled code, for interpretation. Byte codes may be generated and interpreted or compiled in other embodiments. For example a device may supply a new profile or its URL to a gateway when it first communicates with that gateway. The gateway can receive or retrieve the new profile and generate the code at that time.

At step 266, which may follow any of steps 260-264, a conventional Web services description or other similar description is built from the new profile and provided, for example, to the gateway, including one or more servers. In one embodiment, the Web services description provides the description of the event channel that was provided in the input profile received in step 210 and copied into the new profile, or the description that was added as described above if no entry in the profile received was located or no profile was received, the name of the event channel, and the names of container values that may be received in response to the request, for example in the format corresponding to that Web service, such as the self-describing XML format of REST or schema definitions that employ the basic schemas of SOAP. The description includes any or all of the name and identifier of the event channel, and other information that may be useful or necessary in either making a request for event channel data or interpreting the results, either by a human or by a machine.

A different Web services description may be provided for each Web service format supported by the code generated in step 262 and may contain information regarding the format or other information regarding the request for event channel container values or regarding the format or interpretation of the response. Some of this information may be from the description or other information from the new profile and other information may be tailored to the type of the web services format or the specific gateway from which requests are fulfilled. Not all of this information need be supplied, as it may be inferred from the type of web service under which the event channel container values are supplied. In one embodiment, providing the web services description may include registering each event channel as a web service, via conventional UDDI techniques. UDDI information not described herein and not otherwise identifiable by the gateway may be placed in the profile received from the developer and copied into the new profile, and used to register the event channels for a given profile.

Thus, the communication code in the device may be based on the original one or more computer code files containing the event channel declarations, the new profile, the input profile or any of these. The communication code in the gateway and the web services description can be based off the computer code, the input profile or the new profile, which may be received as one of the one or more files, or both.

The use of the profile allows the computer code operating on the gateway to be adaptable to different gateways running different web services and different programs or compilers, or allows the same server to implement different web services capabilities to access the same information. Thus, the profile can be provided as described herein to different gateways and each gateway can generate or adapt its software, or use different software from the others, yet all of them will be based on the new profile, thus providing the same function for each of the entries in the new profile.

In one embodiment, even the profile need not be provided to the gateway. Instead, the types and order of the value or values in the event channel data structure may be described in the event channel data structure itself, allowing the gateway to unpack and translate the container values. The name of the event channel may be supplied with some or all of the event channel data structures, allowing the gateway to identify a correspondence between the event channel identifier and its name. Some or all of the event channel data structures provided to the gateway may contain a URL of a description of the event channel for the gateway to provide to a user or device, or a URL from which descriptions can be located (e.g. the URL of a description directory) may be provided separately to users and devices that would require the description. The descriptions are thus built as described herein and stored on a server that operates independently of the gateway. Each of the names of the data values can include the order of the values, allowing the gateway to provide the value requested by a user or other device using the order specified in the name.

Processing Web Services or Other Requests.

Once the code has been built and stored on one or more gateways, devices or master servers, it is available for use. To use the code, a user can download the description from the gateway or server, which may be supplied as a conventional WSDL file or other similar service, and then build a request for data that corresponds to the requirements of the description, for example, by providing to the gateway a message, file or stream of text containing one or more XML attributes and values that include the name of the event channel and may include the name or names of data values desired. The gateway can provide values corresponding to the request that had been previously received and stored.

Referring now to FIG. 3A, a method of receiving and storing event channel data is shown according to one embodiment of the present invention. In the embodiment in which the code uses the new profile, a profile, such as the new profile, built as described herein, is received as part of step 310. Such embodiment is assumed for the remainder of the description of FIG. 3 unless otherwise noted, though as noted the information from the new profile can be instead included into the code operated as described herein. The new profile may be received from a system that performs some or all of the method of FIG. 2, it may be received by a device as part of a registration process. The device may provide the new profile or it may provide a URL to the new profile and the new profile may be received by requesting it from a server.

The source code and description generated as described above may be received, or they may be built from the new profile.

Steps following step 310 operate using the code built in step 262 of FIG. 2 or step 310 of FIG. 3A.

Event channel data is received 312 from a device and the device identifier, event channel identifier, sequence number and container values are retrieved from the received event channel data, which may be, for example, an event channel data structure built as described below. An acknowledgement is optionally provided to the device that sent the data as part of step 312. As noted, the event channel data structure may include several container values, for example if the container specified by the event channel declaration has a structured type.

The type or types of the values of the event channel data are retrieved from the new profile by locating the entry in the new profile using the event channel identifier 314, and any packed bytes are unpacked, and translated 316 from the network types to the host types of the gateway performing the unpacking using the types from the located entry in the new profile for each respective container value. In one embodiment, such information is included with the event channel data structure and thus such information can be used to optionally unpack, and to translate the data.

In one embodiment, the translation is performed from the network types to host types of the gateway using the types of the container values that are stored in the located entry of the new profile according to the order of the container value types stored in the new profile. Types may be identified using numeric identifiers, and a table lookup may be used to determine the actual type, with the table being separately supplied to the gateway that will perform the translation. It is noted that information from the new profile may be copied as part of step 310 and such copied information may be used instead of information directly retrieved from the new profile or such information may be incorporated into the compiled gateway code.

The translation is made using the code generated and/or supplied as described above. In one embodiment, translation is performed from the network types specified in the new profile to host types in the gateway performing the translation, for example, according to a translation table that each gateway uses that translates network types to host types for that gateway. In one embodiment, a master table may identify all translations for all host types, and the code generated as described herein is generated responsive to a switch or other administrator input that allows the administrator to identify the type of gateway, and the translation will use the entries in the master table for that type. Other embodiments allow an XML-based translation table to enable translations to be tailored to the specific gateway. It is noted that a single gateway may employ several types, and each version of software running in the gateway is tailored to the type that the version supports. Several translations may be performed by the same gateway, for example, to support multiple types of web services.

Translation may include format conversions of the network type to a host type even if the type is otherwise identical, such as by translating from Big Endian to Little Endian or vice versa, depending on the conventions used by the network and host types. In one embodiment, such translation includes converting numbers to character strings suitable for providing in XML format.

Unpacking may be performed to avoid receiving some or all bytes in network types that might otherwise be empty. Unpacking may be optionally performed according to any conventional set of rules that are used to pack (on the device) and unpack (on the gateway) such bytes.

Translation and packing and translation and unpacking may be performed in accordance with a consistent set of rules according to the types of data and order of the data for the event channel. The determination of the types and their order may be made as a result of the event channel identifier, the event channel identifier and the new profile entry for that identifier, or the types and order of the data which may be specified in the event channel data structure received.

The unpacked, translated container values may be stored as part of step 316, with each different container value being stored with the device identifier, event channel identifier the sequence number corresponding to that data, and the name (retrieved from the new profile entry located as described above) of the container value with structured data types being reordered back into the unpacked order. The order may be specified in the located entry of the new profile. In one embodiment, the date and time may be sent with the data, or it may be added to data received in sequence, with the date and time of data received out of sequence specified as undefined, and the date and time is stored with the data.

If gaps in the sequence number for a given device and event channel result from the newly received data, in one embodiment, as part of step 316, such gaps are optionally detected and upon detection, one or more requests may be provided to the device, which will cause the device to provide stored event channel data from its log. The missing sequence numbers may be specified as part of the request, and the device will send any data it has logged that corresponds to the request. In another embodiment, the device will log and resend container values and the other related information described herein for which an acknowledgement was not received. Resending may be performed upon the next successful communication for different event channel data, upon receipt of a message from the gateway or another device, which may be performed as described in the related application.

Receive and Respond to Requests

Figure 3B:
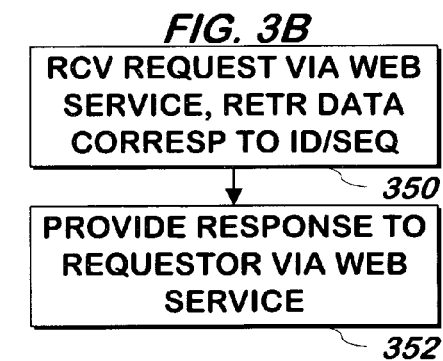
FIG. 3B is a flowchart illustrating a method of receiving and responding to a request for event channel information according to one embodiment of the present invention.

FIG. 3B is a flowchart illustrating a method of responding to requests for event channel data according to one embodiment of the present invention. At any time, a request for event channel data may be received at the gateway 350. The request may specify any or all of a device identifier, event channel name or identifier, sequence number or numbers and/or date and time or a range of these and the names of container values desired or an indication that all container values are desired. The request may be in a conventional web services format, such as using XML with names and other information in the request corresponding to those in the web services description, which the requester may have previously requested and received from the gateway. Information stored corresponding to the request is provided 352 to the requester. The information may be provided in a web services format in accordance with the description for the event channel corresponding to the request. Any number of event channel requests may be received in this manner. It is noted that the description may be provided in other formats, including providing the new profile.

Container values and other data provided in this fashion may be provided, for example, using conventional REST XML or conventional SOAP XML-based communications. In one embodiment, the container values thus provided, are provided in an XML or other representation of the same data structure used by the device that provides the event channel container values. Thus, a structured data type used by the device is faithfully reproduced in XML format or another similar format for the device from which the request was received.

Sending Event Channel Data from the Device.

Figure 4:
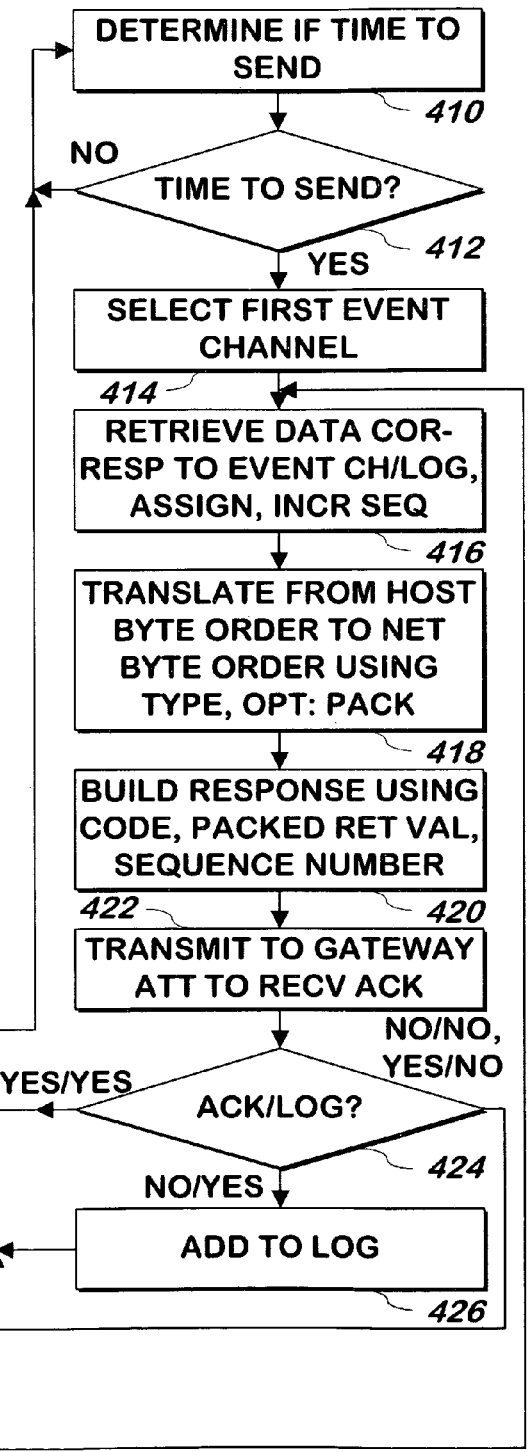
FIG. 4 is a flowchart illustrating a method of providing event channel information by a device according to one embodiment of the present invention.

Referring now to FIG. 4, a method of providing container values is shown according to one embodiment of the present invention. The method of FIG. 4 may use the code for the device generated in the one or more instances of step 246 of FIG. 2.

A determination is made as to whether event channel data is to be sent 410. In one embodiment, event channel data is to be sent if a threshold amount of time has elapsed since the last time that event channel data has been sent, and/or network activity is detected as not being high. In one embodiment, network activity may be measured by the amount of data that has been recently sent within a determination period, though other manners of making such a determination may be used. In another embodiment, event channel data is to be sent if it is received from the program containing the event channel declarations.

If event channel data is not to be sent 412, the method continues at step 410. Otherwise 412, the method continues at step 414.

In one embodiment, at step 414, a first event channel is selected. The first event channel may be one that was last sent the longest amount of time ago or it may be the first one (or the only one) for which event channel data has been received by the program since the last time event channel data was sent. In one embodiment, event channels are selected so that those corresponding to container values that have changed are sent in advance of those that have not changed, so that if communications are interrupted, the changed container values are more likely to be received by the gateway. Thus, step 414 may include retrieving all of the container values corresponding to event channels, identifying those that have changed, assigning an order, and storing them for the next iteration. In one embodiment, even event channels having data that has not changed are occasionally ordered higher if they have not been sent in awhile.

The one or more container values corresponding to the event channel are retrieved or otherwise obtained, and a sequence number is assigned to that set of container values, and the sequence number counter used to store the next sequence number for that event channel is incremented 416.

The container values are those values corresponding to those specified in the event channel declaration. There may be multiple values, for example if the container value specified in the event channel declaration has a structured type. The sequence number is an identifier of the event channel container values retrieved at a particular time that is unique with respect to container values for the event channel retrieved at other nearby times. Any container values logged for that event channel as described below is also retrieved, along with the sequence number or numbers assigned to those sets of container values.

The value or values of the containers retrieved are translated from the one or more host types (e.g. the native type of the device performing the translation) to the corresponding one or more network types using the type or types of the response identified in the new profile as described above (or such information is incorporated into the code in one embodiment), and the translated value or values may be packed 418 as described herein. The packed values, identifier of the event channel, and sequence number or numbers for each set of values provided are built into a data structure 420. As noted above, the data structure may include identifiers of the data types in the data structure and an indication of their order. The data structure is transmitted to the gateway and the date and time of sending for that event channel is recorded 422. In one embodiment, the data structure contains a checksum or other similar indicator of its contents to allow the gateway to determine if it has properly received the data structure.

In one embodiment, the gateway will send an acknowledgement to a received event channel data structure that corresponds to the checksum or other similar data, and an attempt is made to receive the acknowledgement as part of step 422. If the acknowledgment is received 424, if the event channel was one that was specified in the input profile or in the event channel declaration as one that could be replayed from a log, any data logged for that event channel is cleared or marked to allow reuse of the storage space 428. If there are more event channels that are to be sent 430, either because the corresponding container values have changed, it hasn't been sent in the longest amount of time, or because it was received from the program, the next such event channel is selected 432 and the method continues at step 416, using the newly-selected event channel. If there are no more event channels that are to be sent 428, the method continues at step 410. In one embodiment, event channels whose container values have not changed or have not changed and were sent previously within a second, longer, threshold period of time, such event channels are not to be sent.

If the acknowledgement is not received within a threshold period of time 424, if the event channel was specified in the input profile or in the event channel declaration as one that could be replayed from a log, the newly retrieved event channel container values, and sequence number is added to any container values and sequence numbers for that event channel already logged 426 and the method continues at step 430. If the event channel was not so specified to be logged 424, the method continues at step 430.

In the above embodiment, the logged data for an event channel is sent automatically the next time the event channel data is sent. Other embodiments will log data, and may log all data sent, but not send it until a request is received by the device from the gateway as described above. When such a request is received, it will have a range of sequence numbers, and any such event channel data is sent as described above. In another embodiment, any such event channel data is sent with other event channel data for the same event channel or for any event channel. In one embodiment, such "piggybacking" is only performed after an acknowledgement is received to the immediately prior transmission or prior transmission for that event channel. In yet another embodiment, the method described in the related application is performed, and retransmission of logged event channel data is made following a determination that a device or a device is in proximity that has previously acknowledged an event channel transmission by the sending device or an event channel transmission for the same event channel by the sending device. Logged event channel data may be deleted after it is transmitted or may be stored, for example, in a circular buffer or buffer for each event channel so that oldest event channel data or oldest event channel data for that event channel is overwritten.

Any number of event channels having any of a number of different identifiers may be processed in this fashion.

System.

Figure 5:
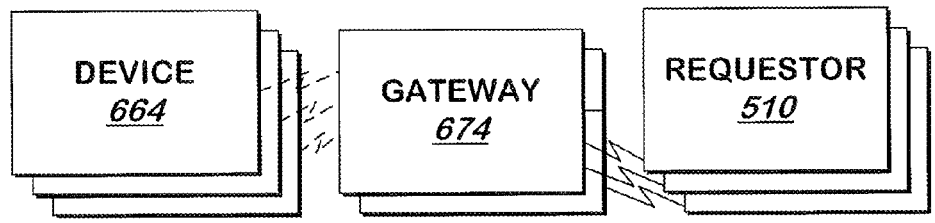
FIG. 5 is a block schematic diagram of a system containing devices of FIG. 7, gateways of FIG. 8 and requesters, the devices that send requests to the gateways and receive container values from the gateways

FIG. 5 is a block schematic diagram of a system including requestors 510, devices 664, and gateways 674. Requestors, such as requestors 510, send event channel requests to gateways, such as gateway 674, which provide the information from event channel data structures corresponding to the requests to the corresponding requestors. The information may be provided in conventional web services formats, or other conventional formats. Event channel data structures are sent wirelessly from devices, such as device 664 to gateways, such as gateway 674.

Each gateway, such as gateway 674, includes code capable of receiving and storing the event channel data structures and responding to such requests, and devices, such as device 664, provide one or more container values as part of event channel data structures to gateways, such as gateway 674. Although three devices 664, three requesters 510, and two gateways 674 are shown as a representative example, any number of devices 664, requesters 510, and gateways 674 may be incorporated in other embodiments.

Code operating on devices 664 and gateways 674 operates the system. Such code is generated automatically from code written to process or maintain container values that the event channel requests retrieve. Requestors identify the form of the requests via a description, such as a WSDL file, that is generated from a profile generated from the code and an optional profile, supplied in conjunction with the code.

Figure 7:
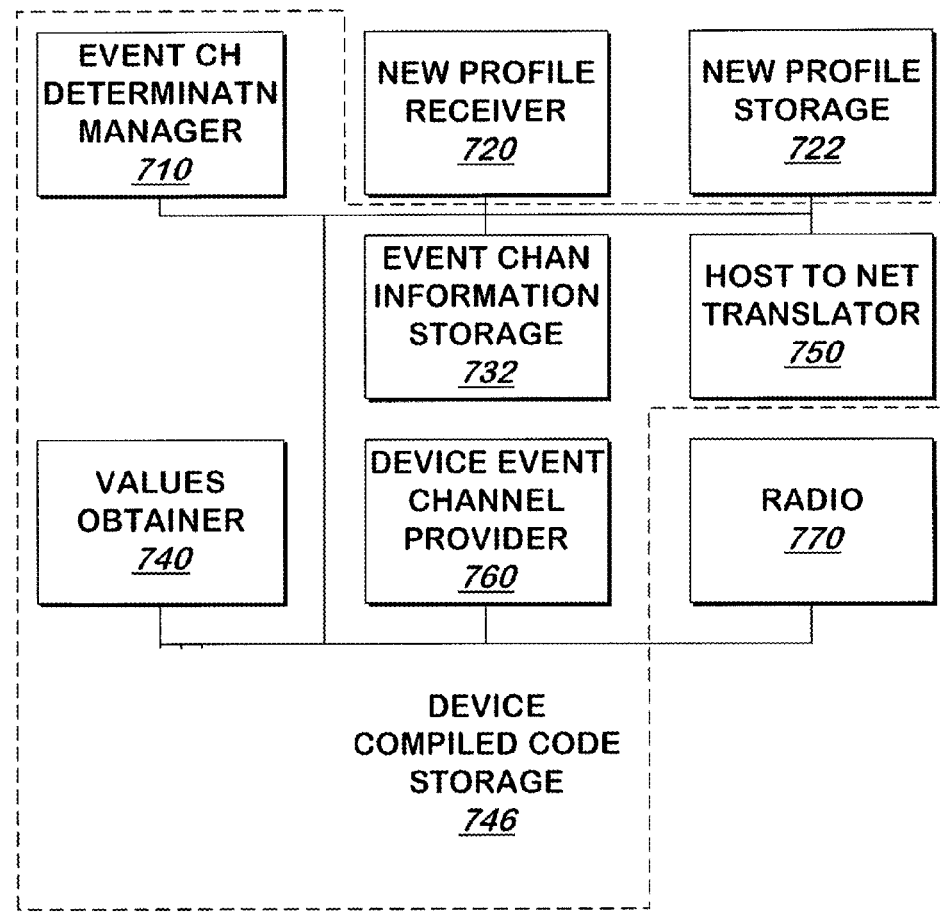
FIG. 7 is a block schematic diagram of a device for providing container values corresponding to event channels according to one embodiment of the present invention.
Figure 6:
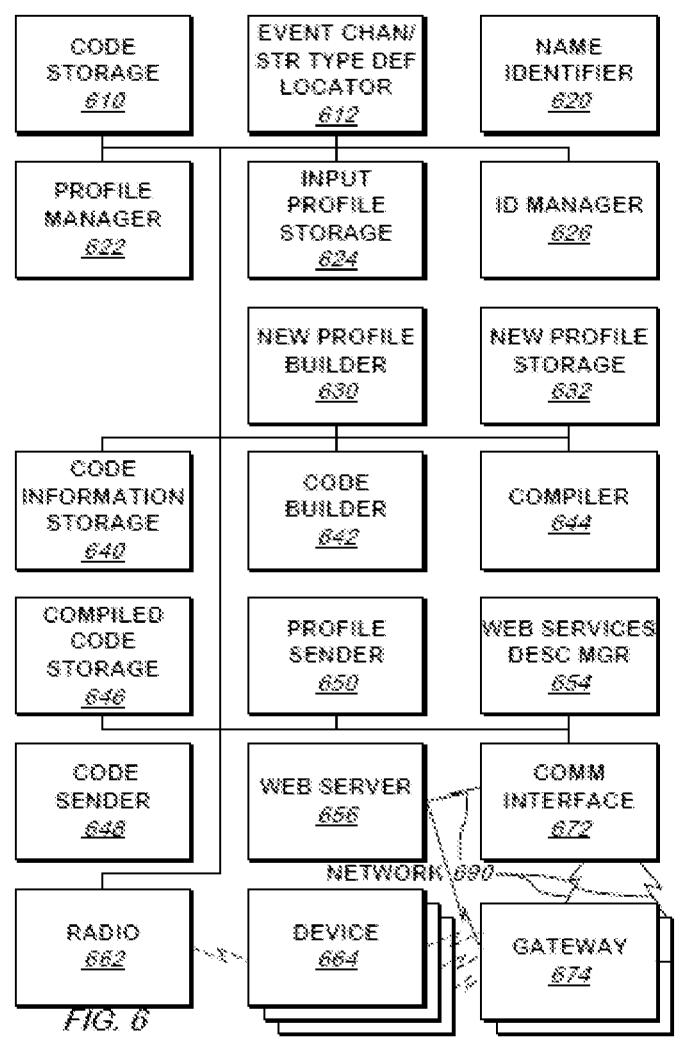
FIG. 6 is a block schematic diagram of a system for generating code for a device and a gateway according to one embodiment of the present invention.
Figure 8:
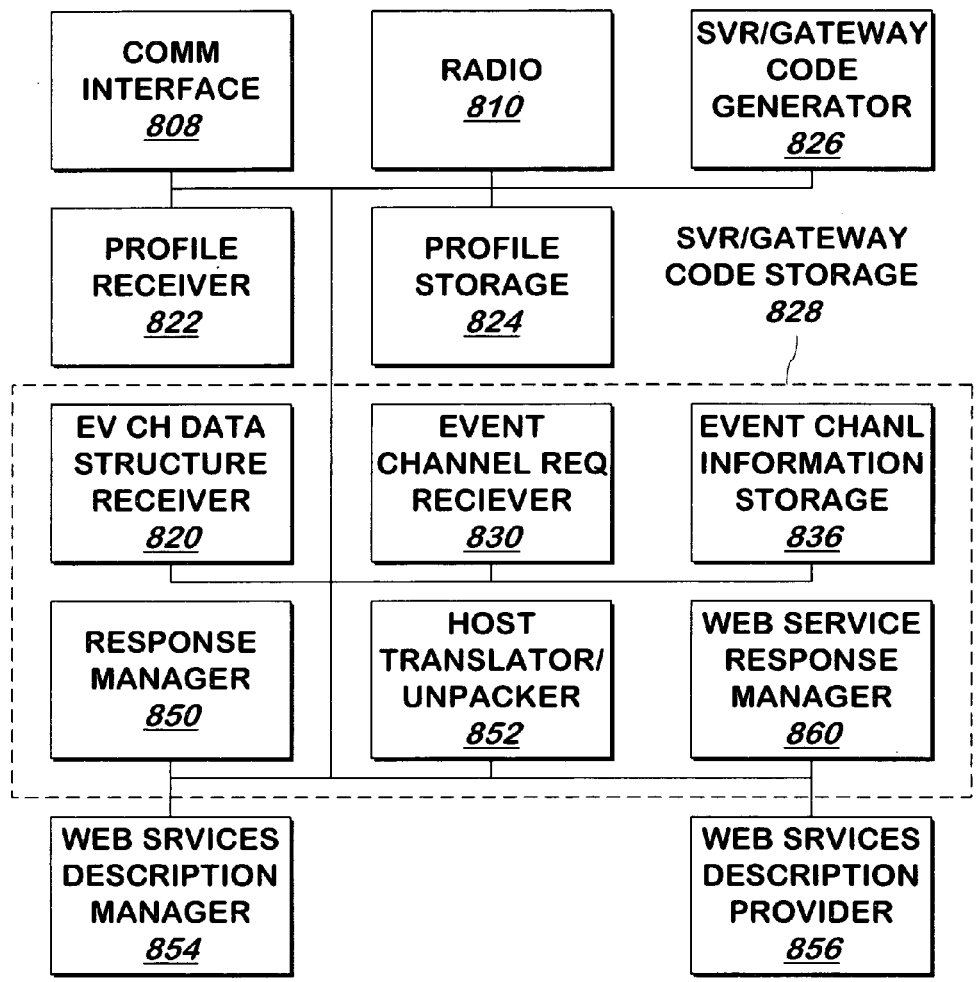
FIG. 8 is a block schematic diagram of a gateway system according to one embodiment of the present invention.

FIG. 6 is a block schematic diagram of a system for generating code for one or more devices 664 and one or more gateways 674, according to one embodiment of the present invention. FIG. 7 shows one device 664 in more detail, according to one embodiment of the present invention, and FIG. 8 shows one gateway 674 in more detail, according to one embodiment of the present invention.

Referring now to FIGS. 5, 6, 7, and 8, at system start-up, event channel/structured type definition locator 612 finds one or more conventional computer code files containing source code stored in code storage 610 and optionally a profile stored in code storage 610. The source code includes some or all of the source code from which the values are accessible, some or all of which have been flagged to allow then to be retrieved remotely as described herein. In one embodiment, code storage 610 includes conventional memory or disk storage. Event channel/structured type definition locator 612 scans the computer code file for event channel declarations, as described herein and above. In one embodiment, such declarations may not be supplied for all container values in the source code.

Event channel/structured type definition locator 612 selects the first of any event channel declarations located in the source code file, and creates an event channel record for that event channel in code information storage 640. In one embodiment, event channel/structured type definition locator 612 flags the event channel record as corresponding to the first event channel (but does not so flag event channel records created for subsequent event channels as described herein and below). Event channel/structured type definition locator 612 adds the event channel declaration, including the flag, to the event channel record in code information storage 640. In one embodiment, code information storage 640 includes conventional memory or disk storage. (In one embodiment, when event channel/structured type definition locator 612 selects the computer code file or files, event channel/structured type definition locator 612 discards any previously stored information for unrelated files in code information storage 640.)

In one embodiment, each event channel declaration includes one or more identifiers of the corresponding data type or types of the container value or values, which may each be a structured type or an elemental type as described herein and above. Event channel/structured type definition locator 612 finds each container value data type identifier in the event channel declaration, and determines whether the type is an elemental or a structured type. An elemental type may be a type known by the compiler that will be used to compile the code for the variables or constants whose values may be retrieved as described herein or one that has a type closer to a network type than any identifiable part of the container, or has no separately identified parts. In one embodiment, event channel/structured type definition locator 612 internally stores a list of data types that includes each of the elemental types defined as described herein and above.

If the data type is an elemental type, event channel/structured type definition locator 612 stores the corresponding data type identifier in the event channel record.

If the data type is a structured type, event channel/structured type definition locator 612 resolves the structured data type into one or more names and elemental types using the type definitions contained in the files in code storage 610. Event channel/structured type definition locator 612 stores the names and the identifiers of each of the elemental data types making up that structured type in the event channel record.

When event channel/structured type definition locator 612 has created and populated the event channel record as described herein, and stored the event channel record in code information storage 640, event channel/structured type definition locator 612 provides a pointer to the event channel record to name identifier 620, and also retains the pointer for use as described herein and below.

When name identifier 620 receives the pointer, name identifier 620 uses the event channel record to determine whether the event channel declaration includes a specified name as described herein. If name identifier 620 finds a specified name, name identifier 620 adds that name to a name field in the event channel record and 620 provides the pointer to the event channel record to input profile manager 622. Otherwise, name identifier 620 assigns a unique name and a unique identifier to the event channel, each not assigned to any other event channel or value corresponding thereto for the set of one or more files and not used by any other event channel in the one or more files, including the input profile and the output profile, stores that name and identifier in the name and identifier fields of the event channel record, sets a flag in the event channel record indicating that the name was assigned, and provides a pointer to the event channel record to new profile builder 630. In one embodiment, the assigned name at least begins with the name of the container name of the event channel.

When input profile manager 622 receives the pointer, input profile manager 622 retrieves the name from the event channel record. Input profile manager 622 compares that name to names included in one or more entries in the input profile stored in input profile storage 624. In one embodiment, the input profile contains one entry for each of any number of event channels, with each entry containing a name for the event channel to which the entry corresponds, and other information such a text explanation of the one or more values that can be remotely retrieved using an event channel request as described herein and above. In one embodiment, input profile storage 624 includes conventional memory or disk storage.

If input profile manager 622 finds in the input profile an entry with a event channel name having the same name as the name included in the event channel record, input profile manager 622 selects the entry. Input profile manager 622 provides the pointer to the event channel record, and a pointer to the selected entry in the input profile to identification manager 626. If input profile manager 622 does not locate the name, input profile manager 622 assigns an identifier to the event channel record and stores it in the event channel record, the identifier being unique among other identifiers used in the input profile or similarly assigned, sets a flag in the event channel record indicating that the identifier was assigned, and provides a pointer to the event channel record to new profile builder 630.

When identification manager 626 receives the pointers, identification manager 626 locates the profile entry. Identification manager 626 determines whether the profile entry includes an event channel identifier. If so, identification manager 626 stores the event channel identifier in an identifier field in the event channel record.

If no event channel identifier is included in the entry having the pointer it receives, identification manager 626 assigns a event channel identifier to the record, stores it in the event channel identifier field in the event channel record and sets the flag in the event channel record indicating that the identifier was assigned. The identifier assigned is unique to those in all entries in the input profile and to assigned identifiers for the set of files. In either event, identification manager 626 also adds to the event channel record any optional additional information from the entry of the input profile corresponding to the pointer it receives.

When identification manager 626 has updated the event channel record and in one embodiment the input profile, identification manager 626 provides the pointer to the event channel record to new profile builder 630.

When new profile builder 630 receives the pointer, new profile builder 630 retrieves the event channel record in code information storage 640. If the event channel record is flagged as the first profile, new profile builder creates a new profile and stores the new profile in new profile storage 632, in one embodiment overwriting any previously stored profile. In one embodiment, new profile storage 632 includes conventional memory or disk storage. If the event channel record is not flagged, new profile builder 630 locates the new profile stored in new profile storage 632.

New profile builder 630 adds the event channel identifier and the name from the event channel record to the new profile as a new entry. New profile builder 630 also adds to the new entry the container names and corresponding data types, and optionally any other additional information from the event channel record, as well as the flags indicating whether the name and/or identifier was assigned, to the new profile, associated with the event channel identifier. There may be several names and types, for example, if the container specified in the event channel declaration had a structured type. When new profile builder 630 has updated the new profile, new profile builder 630 signals event channel/structured type definition locator 612.

When so signaled, event channel/structured type definition locator 612 selects the next event channel declaration included in the one or more computer code files and initiates the same process as described above.

In this fashion, an event channel record is created for each event channel declaration in the computer code file, a pointer to the next event channel record is included in each event channel record, and the information from each event channel record is added to the new profile.

If event channel/structured type definition locator 612 determines that no more event channel declarations are included in the computer code file in code storage 610, event channel/structured type definition locator 612 signals new profile builder 630 to close the file containing the new profile, flags the last event channel record as being the last record, and provides the pointer to the first event channel record to code builder 642 or signals code builder 642. In one embodiment, the event channel records are linked by event channel/structured type definition locator 612, and to flag the last one, event channel/structured type definition locator 612 links to a null pointer. Event channel/structured type definition locator 612 also signals web services description manager 654 and profile sender 650, which proceed as described herein and below.

When code builder 642 receives the pointer, code builder 642 uses the pointer to find the first event channel record in code information storage 640, and uses any pointer contained in that event channel record to find the next event channel record, and so forth until code builder 642 has located all the event channel records. Code builder 642 uses the event channel records (or the information in the new profile or both) to build computer software source code for a device, where the code determines whether it is an appropriate time to send one or more event channel data structures as described above, selects the event channel corresponding to the oldest sent or acknowledged event channel data structure or the oldest one received or the only one received, and then for the selected event channel, obtains the container value or values, translates and/or packs the container values and provides them to a gateway, along with a sequence number for the event channel and event channel identifier. The code for the one or more devices may incorporate the information included in the event channel record input profile or new profile into the code, or the code may use the new profile as an input, and be reusable for different profiles as described herein and above. The operation of the code is described in more detail herein. When code builder 642 has built the code, code builder 642 adds the code to the set of one or more computer code files in code storage 610 and signals compiler 644.

In another embodiment, code builder 642 may generate such code after each new event channel record is completed. In this embodiment, event channel/structured type definition locator 612 provides the pointer to the competed event channel record to code builder 642 before, or as, event channel/structured type definition locator 612 selects the next event channel and creates a new event channel record as described herein and above, and code builder 642 builds code corresponding to the event channel record to which the received pointer points and adds that code to the computer code file in code storage 610. In one embodiment, code builder 642 does not signal compiler 644 after adding the code to the computer code file, except in the case that the pointer to the next event channel record includes a null pointer or the last event channel record (or the last entry in the new profile) is otherwise encountered, and in this case code builder 642 does signal compiler 644.

In another embodiment, the code provided by code builder 642 is not tailored to the event channel declarations, and either uses the new profile as an input or builds code that receives information such as the event channel identifier and data type information from the calling program as described above. Code builder 642 provides the code file to code storage 610, and signals compiler 644.

When so signaled, compiler 644 compiles the one or more computer code files in code storage 610, using conventional compiler techniques, if such code is not already in object code form as noted herein and above. Compiler 644 stores the compiled code in compiled code storage 646 and signals code sender 648. In one embodiment, compiled code storage 646 includes conventional memory or disk storage. When signaled, code sender 648 provides the compiled code to one or more devices 664.

Although the code in code storage 610 may be source code, and the code generated as described herein may also be source code, in one embodiment, the code generated or provided as described herein may be provided in object code form, in which case only the code in code storage is compiled. The code generated or provided may be provided in byte code form, which may also be compiled.

When signaled by event channel/structured type definition locator 612 as described herein and above, web services description manager 654 finds the new profile stored in new profile storage 632, and uses the profile to create a description, such as a web services description, such as a WSDL file, as described above. The web services description contains information about the format and names to be used to request the one or more container values corresponding to the event channels from the gateway 674. The description may include any or all of format, order, and type information and any other information that may be used to make an event channel request and interpret the container values using gateway 674. Web services description manager 654 stores the web services description in web server 656. In one embodiment, web server 656 includes a conventional web server.

Although the generation of a web services description may happen centrally as described above, in another embodiment, the web services description is generated by the gateway, and thus is tailored to the gateway's specific implementation of the one or more requests that are to be used to cause the values to be remotely retrieved. In this embodiment, the web services description manager 654 is not used, and is instead replaced by web services description manager 854 in each gateway or in another server and performs the same functions. Web server 656 may be replaced by web services description provider 756. Each of these are described below.

When signaled by event channel/structured type definition locator 612 as described herein and above, profile sender 650 finds the new profile stored in new profile storage 632, and provides the new profile to each of any number of devices 664, for example via radio 662. In one embodiment, radio 662 is a conventional IEEE 802.15.x-compatible radio that provides some or all of the capabilities described by one or more 802.15.x specifications. Radio 662 transmits and receives data over a wireless network, though wired networks may also be used. Other radios and/or protocols may be used, such as the conventional 802.11a/b/g/h or other similar protocols.

The new profile is received by new profile receiver 720 of each device 664, as shown in FIG. 7 and described in more detail herein and below. Although in FIG. 6 three devices 664 are shown, any number of devices may be incorporated in other embodiments.

In one embodiment, profile sender 650 also or instead provides the new profile to each of any number of gateways 674, for example via network 690 using communication interface 672. In one embodiment, communications interface 672 is any conventional network interface such as a TCP/IP-capable communication interface, which may include a conventional modem, router, LAN interface card or the like, and network 690 is a network such as the Internet or a local area network or both. The new profile is received by profile receiver 822 of each gateway 674, as shown in FIG. 8 and described in more detail herein and below. Although in FIG. 6 two gateways 674 are shown, any number of gateways may be incorporated in other embodiments.

As noted, the portion of the gateways 674 that handle processing of the descriptions may in fact be remote from the gateway. In such embodiment, the new profile may in fact be received by similar apparatus in such separate portion, which may in fact be a separate server.

In one embodiment, profile sender 650 also, or instead, sends the new profile to web server 656, with a request to store the new profile and make it available to gateways 674. Web server 656 stores the new profile and returns a URL which may be used to request the new profile from web server 674, which may be coupled to a network such as the Internet. Profile sender 650 receives the URL and provides it to the devices that receive the compiled code, which receive the URL and store it in the same manner the new profile was sent to the devices.

In one embodiment, profile sender 650 does not provide the new profile to the gateway, and instead registration manager 780 of each device 664 provides the new profile or the URL of the new profile to profile receiver 822 of gateway 674 during a registration phase between the device and the gateway.

Operation of the Code on the Device.

FIG. 7 is a block schematic diagram showing one device 664 in more detail, according to one embodiment of the present invention. Referring now to FIG. 7, at any time code receiver 712 may receive compiled code, via radio 770. Code receiver 712 stores such code into device compiled code storage 746. The code contains elements as described herein. In one embodiment, device compiled code storage 746 is the same as compiled code storage 646. At any time, new profile receiver 720 of device 664 may receive a new profile or a URL for the new profile, via radio 770, for example from profile sender 650 as described herein and above. In one embodiment, radio 770 is a conventional IEEE 802.15.x-compatible radio that provides some or all of the capabilities described by one or more 802.15.x specifications. Radio 770 transmits and receives data over a wireless network, though wired networks may also be used. Other radios and/or protocols may be used, such as the conventional 802.11a/b/g/h or other similar protocols.

When new profile receiver 720 receives the profile or URL, new profile receiver 720 stores the new profile or the URL in new profile storage 722. In one embodiment, new profile storage 722 includes conventional memory or disk storage. In one embodiment, as described herein and above, the profile includes any number of event channel identifiers and, for each event channel identifier, a corresponding name, one or more container names and associated data types.

At any time, event channel determination manager 710 may determine that an event channel data structure should be sent. In one embodiment, such determination is made after a timer expires, though other embodiments are made at a time that event channel data is received from a separate process. Event determination manager 710 requests traffic status from radio 770. If radio 770 reports heavy network traffic, event determination manager 710 sets another timer and waits for the timer to elapse. Otherwise, event channel determination manager 710 selects from event channel information storage 732 the first event channel having a last sent time or last acknowledgement received time older than the corresponding time of any other event channel and checks to see if the difference between such date and time and the current date ad time exceeds a threshold. If not, event channel determination manager 710 sets the timer and waits for the timer to elapse. If the difference exceeds the threshold, event channel determination manager 710 provides the identifier of the event channel to values obtainer 740.

When values obtainer 740 receives the event channel identifier values obtainer 740 retrieves the value or values using the identifier. Portions of values obtainer 740 are built for each event channel identifier as described herein, and an initial control section receives the identifier and then transfers control to the portion of values obtainer 740 that corresponds to the identifier of the event channel it receives. In one embodiment, the container values are ordered either as retrieved or by values obtainer 740 as specified in the new profile or other similar information. When values obtainer 740 retrieves the container values, values obtainer 740 provides the container values, along with the event channel identifier to host to net translator 750.

It is noted that values obtainer 740 may retrieve container values as they exist in the program at that time, or values obtainer 740 may simply receive container values as they are provided by the program. In one embodiment, values obtainer 740 caches the container values as they are received and sends them as described above. In another embodiment, the timer is not used as a trigger, and instead, when one or more container values are received, they are processed immediately as described herein. Thus, the receipt of the container value or values triggers the processing as described herein.

When host to net translator 750 receives the container values and event channel identifier, host to net translator 750 translates each data type from host type to network type, if necessary. In one embodiment, portions of host to net translator 750 are built for each event channel identifier as described herein, and an initial control section receives the identifier and then transfers control to the portion of host to net translator 750 that corresponds to the identifier of the event channel it receives. In one embodiment, host to net translator 750 is part of values obtainer and the portion of host to net translator 750 that performs the operations described herein follow operation of the corresponding portion of values obtainer, and so no separate initial control section of host to net translator 750 is used. In one embodiment, host to net translator 750 also packs the container values. Host to net translator 750 provides the packed, translated container values, along with the sequence number and any gateway identifier received, to device event channel provider 760.

When device event channel provider 760 receives the optionally packed, translated container values, and the event channel identifier device event channel provider 760 builds an event channel data structure including the optionally packed, translated container values, which as noted may be ordered, the event channel identifier, a device identifier device response provider optionally stores, and the sequence number retrieved from event channel information storage 732, using the event channel identifier. Device event channel provider 760 provides the event channel data structure to gateway 674, in one embodiment using the gateway identifier, via radio 770, and the event channel data structure is received by event channel data structure receipt manager 820 of gateway 674 as described herein and below. Device event channel provider 760 updates the sequence number for the event channel in event channel information storage 732 by incrementing it in event channel information storage 732. Other information, such as an indication of the type and order of each of the types of data may be added to the event channel data structure by device event channel provider 760.

It is noted that values from the same container are repeatedly processed in the above manner at different times. As the values change, they will be repeatedly processed as described above. Because different container values may be defined as part of event channels, this processing may occur for each of several container values. However, because not all container values may be defined for transmission via event channels, not all container values are processed in the above fashion.

Replay Management.

In one embodiment, device event channel provider 760 listens for an acknowledgement from the gateway or gateways that received the event channel data structure. If the expected number of acknowledgements are received (in one embodiment, the expected number is one), device event channel provider 760 discards the event channel data structure it sent. Otherwise, device event channel provider 760 uses the event channel identifier to locate in the new profile whether the event channel can be replayed from a log. Such information may have been added to the entry for each event channel by new profile builder 630, which determines whether the capability is to be included based on an optional parameter in the event channel declaration or a parameter in the corresponding new profile entry, with a default value (of yes or no) used if no specification is made.

If the event channel can be replayed from a log, device event channel provider 760 stores the event channel data structure in event channel information storage 732 for use as described herein. In one embodiment, device event channel provider 760 stores the event channel data structure in a circular buffer in event channel information storage 732 whether or not an acknowledgement is received, and in one such embodiment, no acknowledgements are received.

In one embodiment, when device event channel provider 760 provides the event channel data structure, it includes any container values and their corresponding sequence numbers from event channel data structures stored in event channel information storage 732 that have the same event channel identifier as the one being sent as described above as part of the event channel data structure it sends, marking those sequence numbers and container values being replayed, and removing from event channel information storage those for which the expected number of acknowledgements are received, or adding the unmarked ones as described above if no acknowledgement is received.

In another embodiment, instead of sending such event channel data structures data at that time, device event channel provider 760 receives, from one or more gateways via radio 770 requests for event channel data structures corresponding to sequence numbers that were not received by that gateway. In response, via radio 770 builds and sends an event channel data structure for those event channel identifiers and sequence numbers requested.

In still another embodiment, device event channel provider 760 provides from event channel information storage 732 the event channel data structures from each of the event channels for which an acknowledgement has not been received when an acknowledgement is received for any event channel or for the same event channel as those stored or from a device that has previously acknowledged an event channel data structure having the same event channel identifier as any event channel having a data structure stored in event channel information storage 732, in which case only those data structures are provided. Acknowledgements may be received from radio 770, which receives them wirelessly from the sender of the acknowledgement and provides them to device event channel provider 760. When those data structures are acknowledged, device event channel provider 760 marks them in event channel information storage 732 as having been acknowledged or deletes them from event channel information storage.

In one embodiment, device event channel provider 760 performs, using radio 770, the method described in the related application, and resends any unacknowledged event channel data structures stored in event channel information storage 732 upon detection that a device which was supposed to receive them, such as the gateway, is detected as being in proximity with the device containing device event channel provider 760. When those data structures are acknowledged, device event channel provider 760 marks them in event channel information storage 732 as having been acknowledged or deletes them from event channel information storage.

Generation and Storage of Gateway Code.

FIG. 8 is a block schematic diagram showing gateway 674 in more detail, according to one embodiment of the present invention. Referring now to FIG. 8, at any time, profile receiver 822 may receive a profile, for example via communication interface 808, from profile sender 650 of FIG. 6, and/or via radio 810 from registration manager 780 of FIG. 7 during a registration phase between device 664 and gateway 674 as described herein and above. The profile may be the new profile, created as described above. Profile receiver 882 may receive a URL from device 664 during a registration phase and may retrieve the profile from web server 656. In one embodiment, communications interface 808 is any conventional network interface such as a TCP/IP-capable communication interface, which may include a conventional modem, router, LAN interface card or the like, and communications interface 808 is coupled to network 690 of FIG. 6. In one embodiment, radio 810 is a conventional IEEE 802.15.x-compatible radio that provides some or all of the capabilities described by one or more 802.15.x specifications. Radio 810 transmits and receives data over a wireless network, though wired networks may also be used. Other radios and/or protocols may be used, such as the conventional 802.11a/b/g/h or other similar protocols.

When profile receiver 822 receives the profile, profile receiver 822 stores the profile in profile storage 824. In one embodiment, profile storage 824 includes conventional memory or disk storage. Profile receiver 822 also provides a pointer to the profile to sever/gateway code generator 826 and to web services description manager 854.

When web services description manager 854 receives the pointer, web services description manager 854 uses the information contained in the profile and information about how such information will be used to interpret requests to retrieve values using event channel requests to generate a web services description or other description that describes how such requests are to be provided by a user as described herein. Web services description manager 854 stores the web services description or other description into web services description provider 856, which may include a conventional web server and may be part of the gateway or may consist of one or more devices that are remotely located from the gateway. Any repository may be used as web services description provider

856 and there may be any number of them, each containing duplicates of some or all of the descriptions for one or more event channels. Because such description can be tailored to the way the software that interprets the requests will operate on that gateway 674, the web services description for the same or similar device or a device that retrieves the same or similar values may be different in each of two descriptions for different gateways. For example, the type of a container value may be specified differently for different gateways, with one type using one convention and another type using a different convention. As noted above, the gateway need not generate the description. It may be received by profile receiver 822 via radio 810 or communications interface 808, described in more detail below, and stored into web services description provider 856.

It is noted that using the new profile is only one way that web services description manager 854 can generate the description. Web services description manager 854 may generate the description from the code in code storage 610, or the code built by code builder 642 (either the source code or the compiled code version), either of which may be sent with the new profile or instead of the new profile, but using the same mechanism as was described for sending the new profile. Web services description manager 842 may generate the description using the code generated by server/gateway code generator 826. Any of these may be used instead of, or in addition to, the new profile.

When server/gateway code generator 826 receives the pointer, server/gateway code generator 826 uses the profile to generate code for the each entry in the profile, where the code for each entry receives, in the form of event channel data structures, optionally unpacks, translates, and stores event channel container values and identifiers, and receives event channel requests via the Web services format corresponding to the description and processes those requests as described in more detail herein. More than one format may be supported in one embodiment, and the code and the description will reflect the format or formats supported by the gateway 674 to which the code and format correspond. As described herein, the code for the gateway need not be tailored to the new profile, and may instead be provided to operate without effect of the new profile, device code or description, and may in fact, be provided before any of these things are made. Server/gateway code generator 826 stores the generated or otherwise provided code in server/gateway code storage 828.

Server/Gateway code generator 826 may generate the code using the source code from code storage 610 or the code built by code builder 642 or the description in other embodiments. The code may use the new profile as an input, or the information in the new profile may be hard coded into such code. Such code may be provided with, or instead of, the new profile in one embodiment.

The generation by each of the elements code builder 642 and server/gateway code generator 826 may thus be performed by automatic generation of code that is tailored to the supplied computer code, the profile or the code generated from the other element, or it may be provided independently of all of these. As used herein, independently or independent means not tailored to any of the details of any one of them, and thus capable of being provided without access to any of them. The independence would not mean that they cannot interoprate, as the code provided by one of those elements would still interoperate with the other. In one embodiment, one of the elements provides code that is independent in this manner, while the other element generates code tailored to the program, the profile or anything generated from either or both of these as described herein.

Operation of Generated Code.

Operation of the generated code, which is as shown in server/gateway code storage 828, will now be described in more detail.

At different times, event channel data structures are received from devices as described above via radio 810. Radio 810 provides such event channel data structures to event channel data structure receiver 820. Event channel data structure receiver 820 stores the event channel data structure into event channel information storage 836 and provides a pointer to the data structure to type identifier 832. In one embodiment, event channel data structure receiver 820 acknowledges proper receipt of the event channel data structure by noting its identifier and sequence number or numbers in the acknowledgement.

In one embodiment, event channel data structure receiver 820 attempts to identify gaps in sequence numbers for the event channel identifier of the event channel data structure it receives, and if one is detected, requests the missing event channel data structure data by specifying the event channel identifier and the missing sequence number or numbers in a request that it builds and sends via radio 770 to device event channel provider as described herein.

When type identifier 832 receives the pointer, type identifier 832 locates the profile stored in profile storage 824 that corresponds to the identifier of the event channel data structure. Although the profile is used in one embodiment, preprocessed information from the profile may be used instead. For example, the information from the profile may have been stored in a database and such information is used by type identifier 832.

Type identifier 832 uses the profile information to identify the name of each container value or values associated with the event channel identifier, their order, and the data type or types corresponding to each container value. Type identifier 832 stores the name of each container value and its type, in event channel information storage 836, associated with the stored event channel data structure. In one embodiment, the container value or values and corresponding data type or types are included in the profile as an ordered list, and type identifier 832 stores the container value or values and corresponding data type(s) in the same order as they are given in the profile.

In still another embodiment, the event channel data structure is self describing as to the order and type of data in the event channels and so such description is used, and the new profile is not used, to parse and store the container values and types and names in the event channel data structure by type identifier 832. Names of the data structure may be received as well, or may be only occasionally received to allow the order of the container values to be matched to the names. The matching may be done after several data structures for the same event channel are received at different times, with the order of receipt of the container values (e.g. "cv 1", "cv 2") being used as their temporary name. Still other embodiments never send the names of the event channel data structures. The matching of names with the order of the data structures may be made using the new profile or device code when the data is requested by a user or user device, and the order of receipt of each container value may be preserved until such time as the container values are requested.

When type identifier 832 has stored the event channel identifiers and types of the container values in event channel information storage 836, associated with the event channel request, type identifier 832 provides the pointer to the stored event channel request to host translator/unpacker 852. Host translator/unpacker 852 proceeds as described herein and below.

When host translator/unpacker 852 receives the pointer from response manager 850 as described herein and above, host translator/unpacker 852 parses the event channel data structure and locates the container values included in the event channel data structure as described in more detail herein and below. Host translator/unpacker 852 unpacks those values if necessary according to a standard set of rules that was used to pack them. Host translator/unpacker 852 also uses the container value information stored in event channel information storage 836, associated with the event channel request to which the received pointer points, to translate the container values from network type to host type, as described herein. The host type is the type used by the gateway. If there are multiple host types, host translator/unpacker may translate into each of those types, for example, if the same gateway supports different Web Services formats. In one embodiment, host translator/unpacker 852 associates the first container value type provided in the event channel data structure with the first container value identifier (e.g. name) included in the stored container value information, and the second container value provided in the event channel data structure with the second container value identifier included in the stored container value information, etc., until each container value has been associated with a container value identifier according to its unpacked, translated order. Host translator/unpacker 852 provides the unpacked, translated container values and any associated container value identifiers to storage manager 860, along with the pointer to the event channel data structure.

Storage manager 860 stores the optionally unpacked and translated container values into an event channel database in event channel information storage 836, each associated with the names of each such container value associated as described above (or the order in the event channel data structure). Each such name and container value may be stored with the identifier of the event channel, the device identifier and the event channel sequence number from the event channel data structure. Additionally, storage manager 860 may timestamp each container value, either from the event channel data structure if it was inserted by the device, or by retrieving the current date and time from a system clock.

In one embodiment, container values from a single event channel that have the same sequence number as one already stored may be discarded by storage manager 860.

As noted, in one embodiment, some of the container values may have been replayed from a log, and the sequence numbers (or an explicit indicator) may indicate that the values are from the log. Storage manager 860 may store such indications associated with the container values. Such storage allows subscriptions to be managed, so that as new values for an event channel are received, they may be sent automatically.

Processing Requests for Event Channel Container Values.

A user may retrieve the description from web services description provider 856 to determine the proper name, description and format of available event channel container values and the name, identifier or both, of the event channel itself. Web services description provider 856 provides the description from the profile to the requestor via communication interface 808. The user may use such information to make an event channel request. The user may be a device and not have a human associated with it. There may be any number of users.

At any time, event channel request receiver 830 may receive from such a user an event channel request, for example via communication interface 808 as a web service as described herein and above. Communication interface 808 includes a conventional communication interface running conventional communications protocols, and may be coupled to an Ethernet network, the Internet, or both. If the request is for specified event channel container values, event channel request receiver 830 looks up the name in the new profile stored in profile storage 824 and identifies the corresponding event channel identifier from the new profile. Event channel request receiver 830 uses the identifier to find in event channel information storage 836 the event channel container values specified in the request and provides them to the requestor, along with the date and time associated with such values, in one embodiment. The request may specify any or all of the name or identifier of the event channel, a device identifier, names of the container values desired and sequence numbers desired, or an indication that the first or last available sequence number is desired. If the names of the container values are not stored with the container values, event channel request received 830 may infer the names my matching the order of the names specified in the new profile with the order of the container values stored in event channel information storage 836.

The event channel request may include a request for a subscription to an event channel, and if so, an identifier of the requestor or other destination, such as the identifier's IP address or other identifier, which may be stored as a subscription in event channel information storage 836 by request receiver, along with the identifier of the event channel for which the subscription is requested. The identifier may include a device identifier, event channel identifier, or both and may include other specifications of desired container values including those described above.

If the subscription is designated as a push subscription by the user in the request, request receiver 830 provides any currently stored values from the event channel that match any criteria stored in the request, and then stores the last sequence number and any omitted sequence number or numbers in response to the request, and then periodically scans the event channel database in event channel information storage 836, providing any newly received values corresponding to subscriptions and updating the subscription in event channel information storage 836 to indicate the last sequence number of container values provided and the sequence numbers of omitted container values. Request receiver 830 provides such information to the destination specified in the request.

If the request is designated as a pull subscription, request receiver 830 provides such values and updates the subscription when the user submits a request for them with a user identifier matching the one in the request. Thus, a digital path (e.g. wired, wireless disc, or ROM) between the device of FIG. 6 and the device of FIG. 7, and a digital path between either the device of FIG. 6 and/or the device of FIG. 7 and the gateway of FIG. 8 allows transmission of the new profile. The new profile allows conversion between a first format of container value types used on the device, and a second format of container value types used on the gateway or other server, using a third format used for transmission between them, each format being the same or different to allow each format to be optimized or standardized as needed. Because the profile specifies the third format, the device, or the gateway need only to know how to translate between its own format and the third format, referred to as the network format. The system and method automatically builds the communication and conversion code on both the device and the gateway, using the source code, optionally with an input profile, to build such code, and to build a description of each event channel. Because all of these things have the same source, compatibility issues are reduced or eliminated. In spite of the fact that code and description generation are automatic, because of the use of flags, the programmer can restrict the remote provision of values to those flagged.

Thus, there has been disclosed a method of, and computer program product for, automatically generating computer code for providing information from a portable device, including the steps of receiving a first set of computer code written, at least in part for a purpose of operating the portable device, the first set of computer code containing identifiers of a plurality of containers, fewer than all of which are marked as those to be provided from the remote device via automatic generation of software for such providing and for which a textual description useful for retrieving at least one value of a marked container for each of the marked container values is to be automatically generated, at least one of the non-marked values not to be so provided, automatically generating a second set of computer code responsive to the first set of computer code that automatically converts the values in the marked containers from a first format corresponding to the first set of computer code to a second format and automatically provides the converted values from the portable device to a gateway from which the values can be retrieved using requests having a format identifiable from the textual description, automatically generating a third set of computer code responsive to at least one selected from the first set of computer code, the second set of computer code and at least one profile entry corresponding to at least one of the marked containers, the third set of computer code for receiving at the gateway the values from the portable device, converting them from the second format to a third format and providing them in response to requests having the format identifiable from the textual description, and automatically generating the textual description from at least one selected from the first set of computer code, the second set of computer code, the third set of computer code and a profile entry corresponding to the container, the textual description communicating format information regarding requests for retrieving the marked container values.

The method and computer program product may include a feature wherein only some of the marked containers are designated to indicate that indicate that a plurality of values of such designated container at different times should be at least sometimes stored on the device; and the second set of computer code further stores on the device the plurality of values at different times of each of the containers so designated.

The method and computer program product may include a feature wherein the plurality of values are stored responsive to a lack of an acknowledgement of receipt of at least one of the plurality of values.

The method and computer program product may include a feature wherein at least one of the marked containers comprises a structured type comprising several values of differing types, and wherein automatically converting the values in the marked containers comprising the structured type involves converting each of the several values comprising the differing types.

The method and computer program product may include a feature wherein the second format is a standard format, and converting from the first format to the second format comprises identifying a plurality of types of the second format each most closely corresponding to types of the container values converted.

The method and computer program product may include a feature wherein the text description comprises a web services description language file corresponding to a web service, and the values are provided using the web service.

The method and computer program product may include a feature wherein the second set of computer code additionally packs at least some of the values in the marked containers, and the third set of computer code additionally unpacks the packed values.

The method and computer program product may include a feature wherein the second set of computer code additionally receives the values in the marked containers at different times, resulting from operation of the first set of computer code.

The method and computer program product may include a feature wherein the second set of computer code additionally retrieves the values in the marked containers at different times.

There has been disclosed a system for automatically generating computer code for providing information from a portable device, the system including a code storage for storing and providing at an output a first set of computer code written, at least in part for a purpose of operating the portable device, the first set of computer code containing identifiers of a plurality of containers, fewer than all of which are marked as those to be provided from the remote device via automatic generation of software for such providing and for which a textual description useful for retrieving at least one value of a marked container for each of the marked container values is to be automatically generated, at least one of the non-marked values not to be so provided, a code builder having an input coupled to the code storage output for receiving the first set of computer code, the code builder for automatically generating and providing at an output, a second set of computer code responsive to the first set of computer code that automatically converts the values in the marked containers from a first format corresponding to the first set of computer code to a second format and automatically provides the converted values from the portable device to a gateway from which the values can be retrieved using requests having a format identifiable from the textual description, a code generator having an input coupled to the code storage output for receiving the first set of computer code or coupled to the code builder output for receiving at least some of the second set of computer code, or operatively coupled for receiving at least one profile entry corresponding to at least one of the marked containers, the code builder for automatically generating and providing at an output a third set of computer code responsive to at least one selected from the first set of computer code, the second set of computer code and the at least one profile entry corresponding to at least one of the marked containers, the third set of computer code for receiving at the gateway the values from the portable device, converting them from the second format to a third format and providing them in response to requests having the format identifiable from the textual description and a web services description manager having an input coupled to the code storage output for receiving the first set of computer code, or coupled to the code builder output for receiving at least some of the second set of computer code or coupled to the code generator output for receiving the third set of computer code, or operatively coupled for receiving at least one profile entry corresponding to at least one of the marked containers, the code generator for automatically generating and providing at an output the textual description from at least one selected from the first set of computer code, the second set of computer code, the third set of computer code and a profile entry corresponding to the container, the textual description communicating format information regarding requests for retrieving the marked container values.

The system may include a feature wherein only some of the marked containers are designated to indicate that indicate that a plurality of values of such designated container at different times should be at least sometimes stored on the device, and the second set of computer code further stores on the device the plurality of values at different times of each of the containers so designated.

The system may include a feature wherein the plurality of values are stored responsive to a lack of an acknowledgement of receipt of at least one of the plurality of values.

The system may include a feature wherein at least one of the marked containers comprises a structured type comprising several values of differing types, and whereby automatically converting the values in the marked containers comprising the structured type comprises converting each of the several values comprising the differing types.

The system may include a feature wherein the second format is a standard format, and converting from the first format to the second format comprises identifying a plurality of types of the second format each most closely corresponding to types of the container values converted.

The system may include a feature, wherein the text description comprises a web services description language file corresponding to a web service, and the values are provided using the web service.

The system may include a feature, wherein the second set of computer code additionally packs at least some of the values in the marked containers, and the third set of computer code additionally unpacks the packed values.

There has been disclosed a method of, and computer program product for automatically generating computer code for providing information from a portable device, including receiving a first set of computer code written, at least in part for a purpose of operating the portable device, the first set of computer code containing identifiers of a plurality of containers, fewer than all of which are marked as those to be provided from the remote device via automatic generation of software for such providing and for which a textual description useful for retrieving at least one value of a marked container for each of the marked container values is to be automatically generated, at least one of the non-marked values not to be so provided, performing either A or B selected from A) responsive to the first set of computer code, automatically generating a second set of computer code that automatically converts the values in the marked containers from a first format corresponding to the first set of computer code to a second format and automatically provides the converted values from the portable device to a gateway from which the values can be retrieved using requests having a format identifiable from the textual description, and providing at least one third set of computer code for receiving at the gateway the values from the portable device, converting them from the second format to a third format and providing them in response to requests having the format identifiable from the textual description, B) providing a second set of computer code, that automatically converts the values in the marked containers from a first format corresponding to the first set of computer code to a second format and automatically provides the converted values from the portable device to a gateway from which the values can be retrieved using requests having the format identifiable from the textual description, and automatically generating at least one third set of computer code responsive to at least one selected from the first set of computer code, the second set of computer code and at least one profile entry corresponding to at least one of the marked containers, the third set of computer code for receiving at the gateway the values from the portable device, converting them from the second format to a third format and providing them in response to requests having the format identifiable from the textual description, and automatically generating the textual description from at least one selected from the first set of computer code, the second set of computer code, the third set of computer code and a profile entry corresponding to the container, the textual description communicating format information regarding requests for retrieving the marked container values.

The method and computer program product may include a feature, wherein for A, the second set of computer code is tailored, at least in part, for operation for the marked containers, and the third set of computer code is not tailored for operation for the marked containers; and for B, the second set of computer code is not tailored for operation for the marked containers, and the third set of computer code is tailored, at least in part, for the marked containers.

The method and computer program product may include a feature wherein the tailored for operation for the marked containers comprises at least one function built to process at least one structured type corresponding to at least one of the marked containers.

The method and computer program product may include a feature, wherein the not tailored for operation for the marked containers comprises sending or receiving an identifier of at least one type.

The method and computer program product may include a feature, wherein the at least one third set of computer code comprises a plurality of third sets of computer code, wherein each of the third sets comprises a same function, and at least one of the at least one third sets of computer code comprises computer code different from at least one other of the at least one third sets of computer code.

There has been disclosed a system for automatically generating computer code for providing information from a portable device, including a code storage for storing and providing at an output a first set of computer code written, at least in part for a purpose of operating the portable device, the first set of computer code containing identifiers of a plurality of containers, fewer than all of which are marked as those to be provided from the remote device via automatic generation of software for such providing and for which a textual description useful for retrieving at least one value of a marked container for each of the marked container values is to be automatically generated, at least one of the non-marked values not to be so provided, one selected from A) a code builder having an input coupled to the code storage output for receiving the first set of computer code, the code builder for automatically generating and providing at an output, a second set of computer code responsive to the first set of computer code that automatically converts the values in the marked containers from a first format corresponding to the first set of computer code to a second format and automatically provides the converted values from the portable device to a gateway from which the values can be retrieved using requests having a format identifiable from the textual description, and a code generator for providing at an output a third set of computer code independent of the first set of computer code, the second set of computer code and the at least one profile entry corresponding to at least one of the marked containers, the third set of computer code for receiving at the gateway the values from the portable device, converting them from the second format to a third format and providing them in response to requests having the format identifiable from the textual description; and B) a code builder for providing at an output, a second set of computer code independent of the first set of computer code that automatically converts the values in the marked containers from a first format received from the first set of computer code to a second format and automatically provides the converted values from the portable device to a gateway from which the values can be retrieved using requests having a format identifiable from the textual description, and a code generator having an input coupled to the code storage output for receiving the first set of computer code or coupled to the code builder output for receiving at least some of the second set of computer code, or operatively coupled for receiving at least one profile entry corresponding to at least one of the marked containers, the code generator for automatically generating and providing at an output a third set of computer code responsive to at least one selected from the first set of computer code, the second set of computer code and the at least one profile entry corresponding to at least one of the marked containers, the third set of computer code for receiving at the gateway the values from the portable device, converting them from the second format to a third format and providing them in response to requests having the format identifiable from the textual description; and a web services description manager, having an input coupled to the code storage output for receiving the first set of computer code, or coupled to the code builder output for receiving at least some of the second set of computer code, or coupled to the code generator output for receiving the third set of computer code, or operatively coupled for receiving at least one profile entry corresponding to at least one of the marked containers, the web services description manager for automatically generating and providing at an output the textual description from at least one selected from the first set of computer code, the second set of computer code, the third set of computer code and a profile entry corresponding to the container, the textual description communicating format information regarding requests for retrieving the marked container values.

The system may include a feature, wherein for A, the code builder tailors the second set of computer code, at least in part, for operation for the marked containers, and the code generator does not tailor the third set of computer code for operation for the marked containers, and for B, the code builder does not tailor the second set of computer code for operation for the marked containers, and the code generator tailors, at least in part, the third set of computer code for the marked containers.

The system may include a feature, wherein the tailored for operation for the marked containers comprises at least one function built to process at least one structured type corresponding to at least one of the marked containers.

The system may include a feature, wherein the not tailored for operation for the marked containers comprises sending or receiving an identifier of at least one type. The system may include a feature, wherein the at least one third set of computer code comprises a plurality of third sets of computer code, wherein each of the third sets comprises a same function, and at least one of the at least one third sets of computer code comprises computer code different from at least one other of the at least one third sets of computer code.

What is claimed is:

1. A method of automatically generating computer instructions for providing information from a portable device, comprising:
    identifying, at a gateway, at least one container marked with an indicator from among a plurality of containers in a set of computer code associated with a portable device, the at least one marked container having a first textual description and a value, wherein less than all of the containers in the first set of computer code are marked with the indicator;
    responsive to identifying the at least one marked container, generating, at the gateway, a first set of computer instructions to:
        generate a first converted value by converting the value in the at least one marked container from a first format corresponding to the first set of computer code to a second format, and provide the first converted value from the portable device to the gateway, providing the first set of computer instructions to the portable device;
    and generating a second set of computer instructions to:
    receive, at the gateway, the first converted value from the portable device, and generate a second converted value by converting the first converted value from the second format to a third format, the third format being different from the first and second formats,
    wherein the first and second sets of computer instructions are instructions enabling translation of values in the marked containers to enable the portable device to be compatible with another computing device;
    wherein at least one of the marked containers comprises a structured type comprising several values of differing types;
    and converting the values in the marked containers comprising the structured type comprises converting each of the several values comprising the differing types;
    generating a second textual description from the second set of computer instructions the second textual description configured to indicate a format associated with requests for retrieving the marked container value, the second textual description associated with the first textual description, wherein the second textual description comprises a web services description language file corresponding to a web service, and wherein the values are provided using the web service.

2. The method of claim 1, wherein only some of the marked containers are designated to indicate that a plurality of values of such designated container at different times should be at least sometimes stored on the device;
    and the first set of computer instructions further stores on the device the plurality of values at different times of each of the containers so designated.

3. The method of claim 2 wherein the plurality of values are stored responsive to a lack of an acknowledgement of receipt of at least one of the plurality of values.

4. The method of claim 1, wherein:
    the second format is a standard format;
    and converting from the first format to the second format comprises identifying a plurality of types of the second format each most closely corresponding to types of the container values converted.

5. The method of claim 1, wherein:
    the first set of computer instructions additionally packs at least some of the values in the marked containers;
    and the second set of computer instructions additionally unpacks the packed values.

6. The method of claim 1 wherein the first set of computer instructions additionally receives the values in the marked containers at different times, resulting from operation of the set of computer code.

7. The method of claim 1 wherein the first set of computer instructions additionally retrieves the values in the marked containers at different times.

8. The method of claim 1, wherein the first textual description is a name of the container value.

9. A computer program product comprising a non-transitory computer readable medium having computer readable program code embodied therein for automatically generating computer instructions for providing information from a portable device, the computer program product comprising computer readable program code devices configured to cause a computer system to:

identify, at a gateway, at least one container marked with an indicator from among a plurality of containers in a set of computer code associated with a portable device, the at least one marked container having a first textual description and a value, wherein less than all of the containers in the first set of computer code are marked with the indicator;

responsive to identifying the at least one marked container, generating, at the gateway, a first set of computer instructions to:

generate a first converted value by converting the value in the at least one marked container from a first format corresponding to the first set of computer code to a second format, and provide the first converted value from the portable device to the gateway, providing the first set of computer instructions to the portable device;

and generate a second set of computer instructions to:

receive, at the gateway, the first converted value from the portable device, and generate a second converted value by converting the first converted value from the second format to a third format, the third format being different from the first and second formats, wherein the first and second sets of computer instructions are instructions enabling translation of values in the marked containers to enable the portable device to be compatible with another computing device;

wherein at least one of the marked containers comprises a structured type comprising several values of differing types;

and converting the values in the marked containers comprising the structured type comprises converting each of the several values comprising the differing types;

generating a second textual description from the second set of computer instructions the second textual description configured to indicate a format associated with requests for retrieving the marked container value, the second textual description associated with the first textual description, wherein the second textual description comprises a web services description language file corresponding to a web service, and wherein the values are provided using the web service.

10. The computer program product of claim 9, wherein only some of the marked containers are designated to indicate that plurality of values of such designated container at different times should be at least sometimes stored on the device;

and the first set of computer instructions further stores on the device the plurality of values at different times of each of the containers so designated.

11. The computer program product of claim 10 wherein the plurality of values are stored responsive to a lack of an acknowledgement of receipt of at least one of the plurality of values.

12. The computer program product of claim 9, wherein:
the second format is a standard format;
and converting from the first format to the second format comprises identifying a plurality of types of the second format each most closely corresponding to types of the container values converted.

13. The computer program product of claim 9, wherein:
the first set of computer instructions additionally packs at least some of the values in the marked containers;
and the second set of computer instructions additionally unpacks the packed values.

14. The computer program product of claim 9 wherein the first set of computer instructions additionally receives the values in the marked containers at different times, resulting from operation of the set of computer code.

15. The computer program product of claim 9 wherein the first set of computer instructions additionally retrieves the values in the marked containers at different times.

16. The method of claim 9, wherein the first textual description is a name of the container value.

* * * * *

UNITED STATES PATENT AND TRADEMARK OFFICE
CERTIFICATE OF CORRECTION

| | | |
|---|---|---|
| PATENT NO. | : 8,789,012 B1 | Page 1 of 1 |
| APPLICATION NO. | : 12/002615 | |
| DATED | : July 22, 2014 | |
| INVENTOR(S) | : Gilman Tolle | |

It is certified that error appears in the above-identified patent and that said Letters Patent is hereby corrected as shown below:

In the Specification

In column 27, lines 61 and 62, please replace:
"interoprate" with "interoperate"

Signed and Sealed this
Twenty-fifth Day of August, 2015

Michelle K. Lee
*Director of the United States Patent and Trademark Office*